United States Patent [19]

Hachisuka et al.

[11] Patent Number: 5,609,187

[45] Date of Patent: Mar. 11, 1997

[54] DEVICE FOR FORMING WAVE WINDING, AND JIGS FOR FORMING AND HOLDING WAVE WINDING

[75] Inventors: Kimio Hachisuka; Hiroyuki Noguchi; Tomoaki Momose, all of Sayama, Japan

[73] Assignee: Honda Giken Kogyo Kabushiki Kaisha, Tokyo, Japan

[21] Appl. No.: 430,885

[22] Filed: Apr. 28, 1995

[30]     Foreign Application Priority Data

Apr. 28, 1994   [JP]   Japan .................................. 6-91656
Apr. 28, 1994   [JP]   Japan .................................. 6-91658
Apr. 28, 1994   [JP]   Japan .................................. 6-91670

[51] Int. Cl.⁶ ............................................ B21F 3/00
[52] U.S. Cl. ............................................ 140/92.2
[58] Field of Search ........................ 140/92.1, 92.2

[56]             References Cited

U.S. PATENT DOCUMENTS 4,307,311  12/1981  Grozinger .
4,399,949   8/1983  Penn et al. .
4,752,707   6/1988  Morrill .
5,372,165  12/1994  Leame .
5,406,987   4/1995  Gassner et al. .

FOREIGN PATENT DOCUMENTS 0067112  12/1982  European Pat. Off. .
4306624   9/1994  Germany .

Primary Examiner—Lowell A. Larson
Attorney, Agent, or Firm—Birch, Stewart, Kolasch & Birch, LLP

[57]             ABSTRACT

A wave winding forming device has a winding jig including inner posts and outer posts mounted on a turntable, a guide jig for guiding an enameled wire, and a displacing mechanism for relatively displacing the winding jig and the guide jig in axial and radial directions of the turntable to wind the enameled wire alternately around inner circumferential surfaces of the inner posts and outer circumferential surfaces of the outer posts for thereby forming a wave winding.

18 Claims, 22 Drawing Sheets

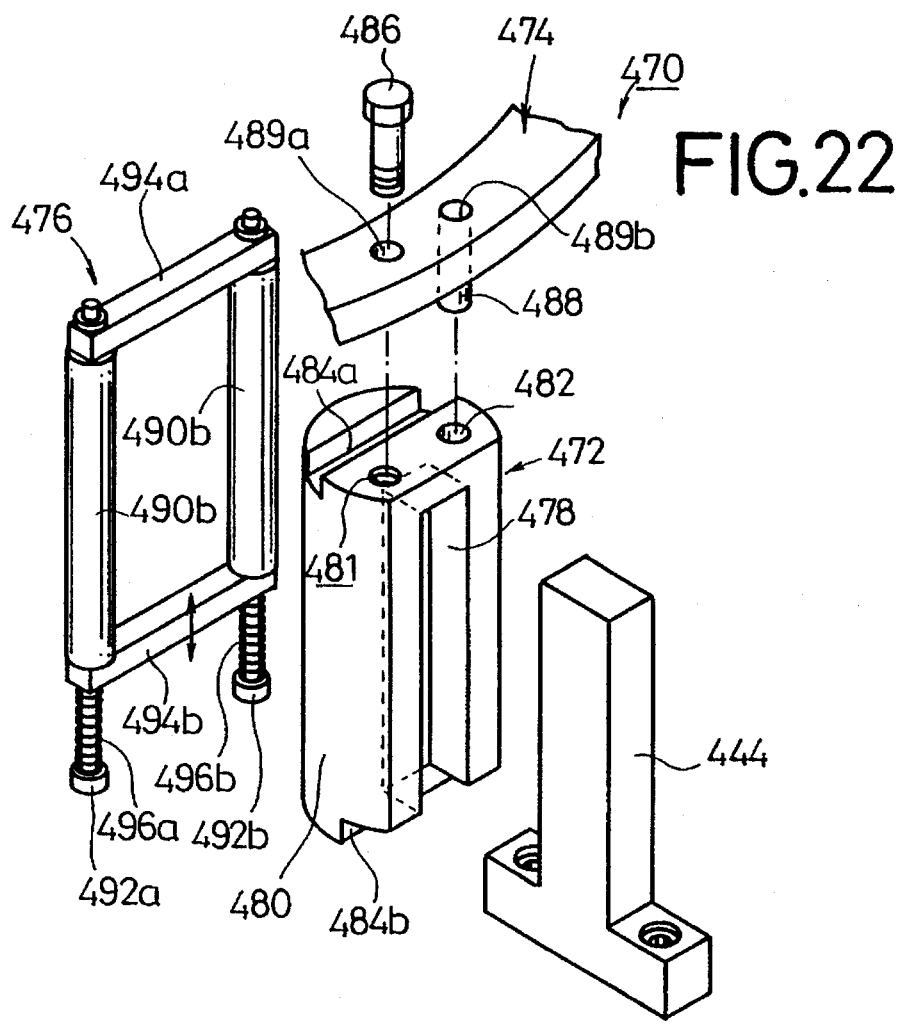
FIG.22
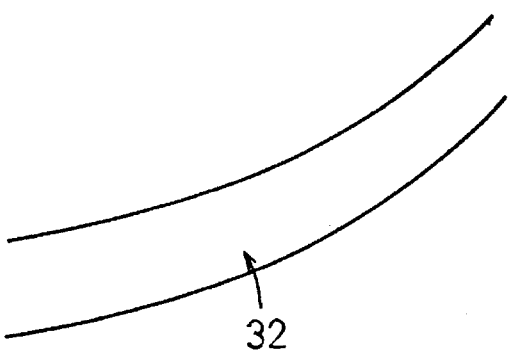

FIG.25
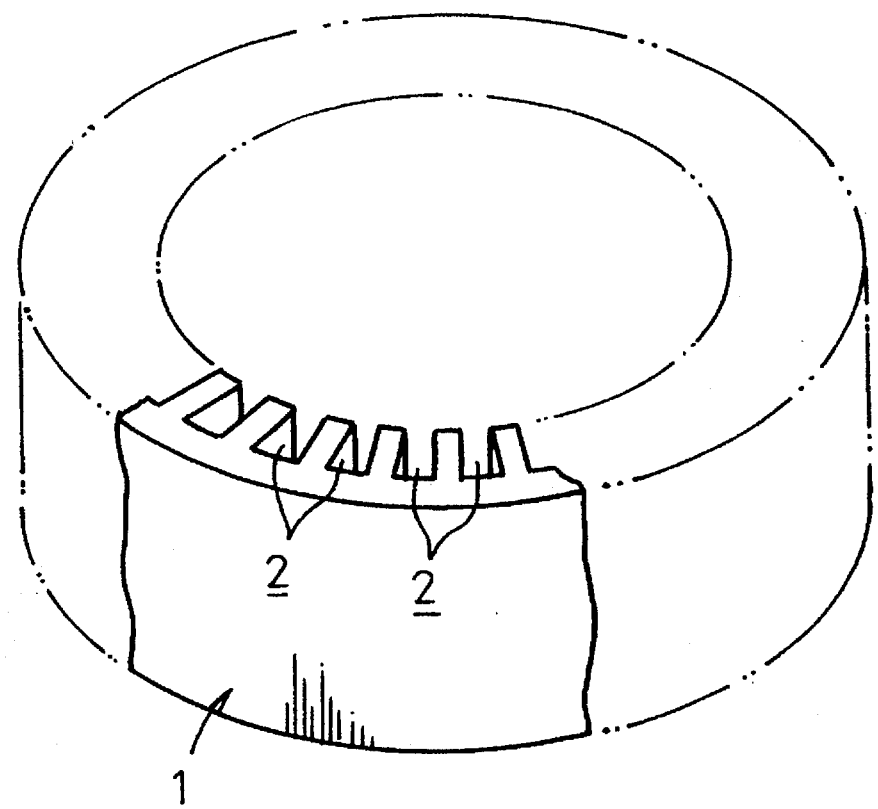
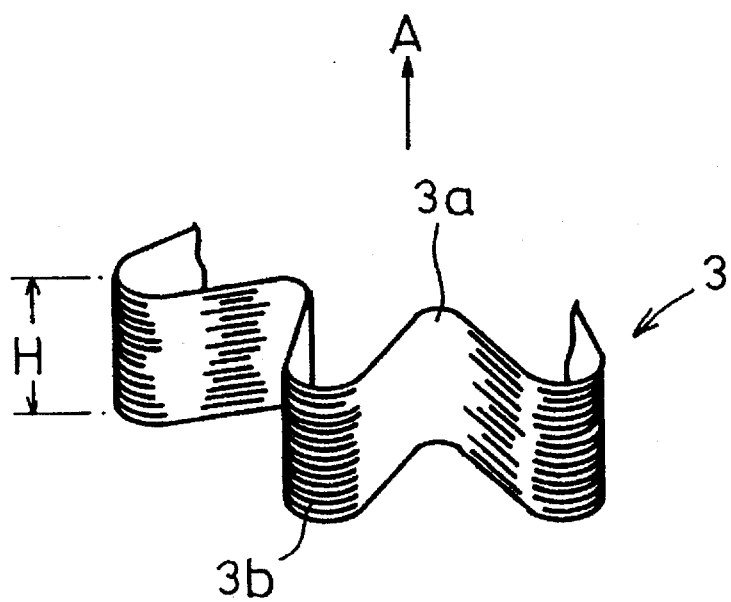

DEVICE FOR FORMING WAVE WINDING, AND JIGS FOR FORMING AND HOLDING WAVE WINDING

BACKGROUND OF THE INVENTION

1. Field of the Invention

The present invention relates to a device for forming a wave winding to be inserted in slots of an iron core, into a wavy shape complementary to the slots, and jigs for forming and holding such a wave winding.

2. Description of the Related Art

Generally, electric motors comprise a stator core having as many windings as the number of phases and a rotor having a plurality of permanent magnets on its outer circumferential surface and positioned rotatably in the stator core. The stator core is composed of a stack of steel sheets joined integrally together, and has a plurality of slots defined in its inner circumferential surface. The windings are disposed in the slots of the stator core.

The windings comprise insulated conductive wires, e.g., coils of enameled wire, and are required to be of a wavy shape complementary to the slots of the stator core so that the windings can be inserted in the slots. The slots are defined at predetermined angular intervals in the inner circumferential surface of the stator core and juxtaposed in the axial direction of the stator core. The windings have wavy portions that are bent axially and inserted in the respective slots.

Heretofore, a winding has been shaped into a wavy configuration as shown in FIG. 24 of the accompanying drawings. In FIG. 24, an enameled wire 9 is wound around an annular pattern of posts 6, forming a winding 3, which is then pressed radially inwardly between the posts 6 by outer punches 8 that are positioned in respective gaps between the posts 6. In this manner, the winding 3 is given a wavy shape as indicated by the two-dot-and-dash lines in FIG. 24 of the accompanying drawings.

According to the conventional process shown in FIG. 24, however, the insulating layer on the enameled wire 9 which is brought into frictional contact with the posts 6 and the outer punches 8 is easily damaged because the enameled wire 9 wound in an annular pattern around the posts 6 is forcibly pressed by the outer punches 8. The damaged insulating layer makes the winding 3 low in quality. The damage on the enameled wire 9 may be avoided or minimized when the force applied by the outer punches 8 is reduced. However, if the force applied by the outer punches 8 is reduced, then the enameled wire 9 will not be sufficiently pressed into a desired wavy form.

As shown in FIG. 25 of the accompanying drawings, the wave winding 3 which is complementary in shape to slots 2 defined in the inner circumferential surface of a stator core 1 has inwardly curved portions 3a alternating with outwardly curved portions 3b. The inwardly curved portions 3a are pressed transversely in the direction indicated by the arrow A to insert the winding 3 into the slots 2 while bending the winding 3 at 90° in the direction A.

The inwardly curved portions 3a and the outwardly curved portions 3b are formed by the posts 6 and the outer punches 8 which are of the same diameter along their axial direction. Therefore, when the winding 3 is pressed transversely, the curvature of the inwardly curved portions 3a and the outwardly curved portions 3b remains unchanged transversely. Accordingly, upon the winding 3 being pressed transversely, it is inserted into the slots 2 while its width H is maintained rather than being changed. For this reason, the space factor of the winding 3 in the slots 2 cannot be increased.

As shown in FIG. 27 of the accompanying drawings, the winding 3 of a wavy shape is held by a plurality of blades 5 of an insert jig (insert means) 4. Upon insertion of the insert jig 4 into the stator core 1, a punch 7 of the insert jig 4 is moved axially in the direction indicated by the arrow, pushing the inwardly curved portions 3a from the blades 5 thereby to place the winding 3 in the slots 2 of the stator core 1.

The winding 3 is inserted into gaps between the blades 5 after it has been shaped into a wavy configuration by a shaping device as shown in FIG. 24. While the wave winding 3 is being transferred from the shaping device to the insert jig 4, it is necessary to keep the winding 3 wavy in shape. For maintaining the winding 3 in the wavy shape, it has been customary to apply adhesive tapes to the inwardly curved portions 3a and the outwardly curved portions 3b after the shaped winding 3 has been produced by the shaping device.

The adhesive tapes are, however, problematic in that since they are likely to be peeled off while the wave winding 3 is being transferred from the shaping device to the insert jig 4, it often is difficult to keep the winding 3 neatly in the desired wavy configuration. Another drawback is that the winding 3 cannot be maintained neatly in the desired wavy shape when it is set on the insert jig 4 because the winding 3 is kept in shape only by the adhesive tapes.

SUMMARY OF THE INVENTION

It is a first object of the present invention to provide a device for forming a winding reliably and easily into a desired wavy shape while effectively preventing an insulating layer on a conductive wire from being damaged.

A second object of the present invention is to provide a jig of simple structure for forming a wave winding such that the space factor of the winding in slots defined in an iron core can easily and reliably be increased.

A third object of the present invention is to provide a jig for holding a wave winding for reliably transferring the wave winding to an inserting means which inserts the wave winding into slots defined in an iron core, while keeping the wave winding in its neat wavy configuration.

The first object can be achieved by a wave winding forming device for forming a winding to be inserted into slots of an iron core, into a wavy-shape complementary to the slots, comprising a turntable, a winding jig mounted on the turntable, the winding jig comprising a plurality of first posts for forming inwardly curved portions of the wavy shape and a plurality of second posts for forming outwardly curved portions of the wavy shape, a conductive wire supply for supplying a conductive wire, a guide jig for guiding the conductive wire from the conductive wire to the winding jig, and a displacing mechanism for relatively displacing the winding jig and the guide jig in axial and radial directions of the turntable to wind the conductive wire guided by the guide jig alternately around inner circumferential surfaces of the first posts and outer circumferential surfaces of the second posts for thereby forming a wave winding.

In the wave winding forming device, the turntable is rotated, and the winding jig and the guide jig are relatively displaced in the axial and radial directions of the turntable by the displacing mechanism. The conductive wire as it is unreeled from the conductive wire supply is guided by the guide jig, and wound alternately around inner circumferential surfaces of the first posts and outer circumferential surfaces of the second posts. The conductive wire is formed into a winding having a wavy configuration highly efficiently with ease. Since no excessive pressure is applied to the conductive wire, the winding of high quality can reliably be formed without suffering the risk of substantial damage thereon.

The second object can be achieved by a wave winding forming jig for forming a winding to be inserted into slots of an iron core, into a wavy shape complementary to the slots, comprising a turntable, a plurality of first posts mounted on the turntable and having varying-diameter outer circumferential surfaces including smaller-diameter portions on upper end portions thereof, for forming first curved portions of the wavy shape, a plurality of second posts mounted on the turntable and having varying-diameter outer circumferential surfaces including larger-diameter portions on upper end portions thereof, for forming second curved portions of the wavy shape, and tilting means for tilting the second posts toward a center of the turntable.

In the wave winding forming jig, after the conductive wire is wound alternately around the first and second posts, forming a winding having a wavy configuration, the second posts are tilted toward the center of the turntable by the tilting means, allowing the winding to be removed smoothly from the first and second posts. Since the winding has been shaped by being wound around the varying-diameter outer circumferential surfaces of the first and second posts, inwardly and outwardly curved portions of the winding have curvatures that vary in the transverse direction of the winding. Therefore, when the winding is pressed transversely for insertion into an iron core, turns of the winding are cause to overlap each other, thereby reducing the entire width of the winding. When the winding is inserted into slots of the iron core, the turns of the winding are bundled in the slots. Therefore, the space factor of the winding in the slots is reliably increased.

The third object can be achieved by a wave winding holding jig for holding a winding to be inserted into slots of an iron core by insert means, in a wavy shape complementary to the slots, and transferring the winding to the insert means, comprising a turntable, a plurality of posts mounted on the turntable for forming first curved portions of the wavy shape, a plurality of guide members detachably mounted on the posts, respectively, and having respective curved surfaces for supporting the winding wound therearound, and a setting member for being secured to the guide members with the winding being kept in a wavy shape around the guide members.

In the wave winding holding jig, the winding is given a wavy shape when it is wound around the curved surfaces of the guide members which have been mounted on the posts on the turntable. When the guide members are integrally secured to the setting member, the winding is kept accurately in its wavy configuration. Therefore, the winding can be transferred easily and quickly to the insert means while the wavy shape of the winding is being neatly maintained.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 22 is an exploded perspective view of a portion of the wave winding holding jig according to the sixth embodiment;

FIG. 25 is a fragmentary perspective view illustrative of the manner in which the wave winding formed by the conventional process is inserted into a stator core;

DETAILED DESCRIPTION OF THE PREFERRED EMBODIMENTS

Figure 1:
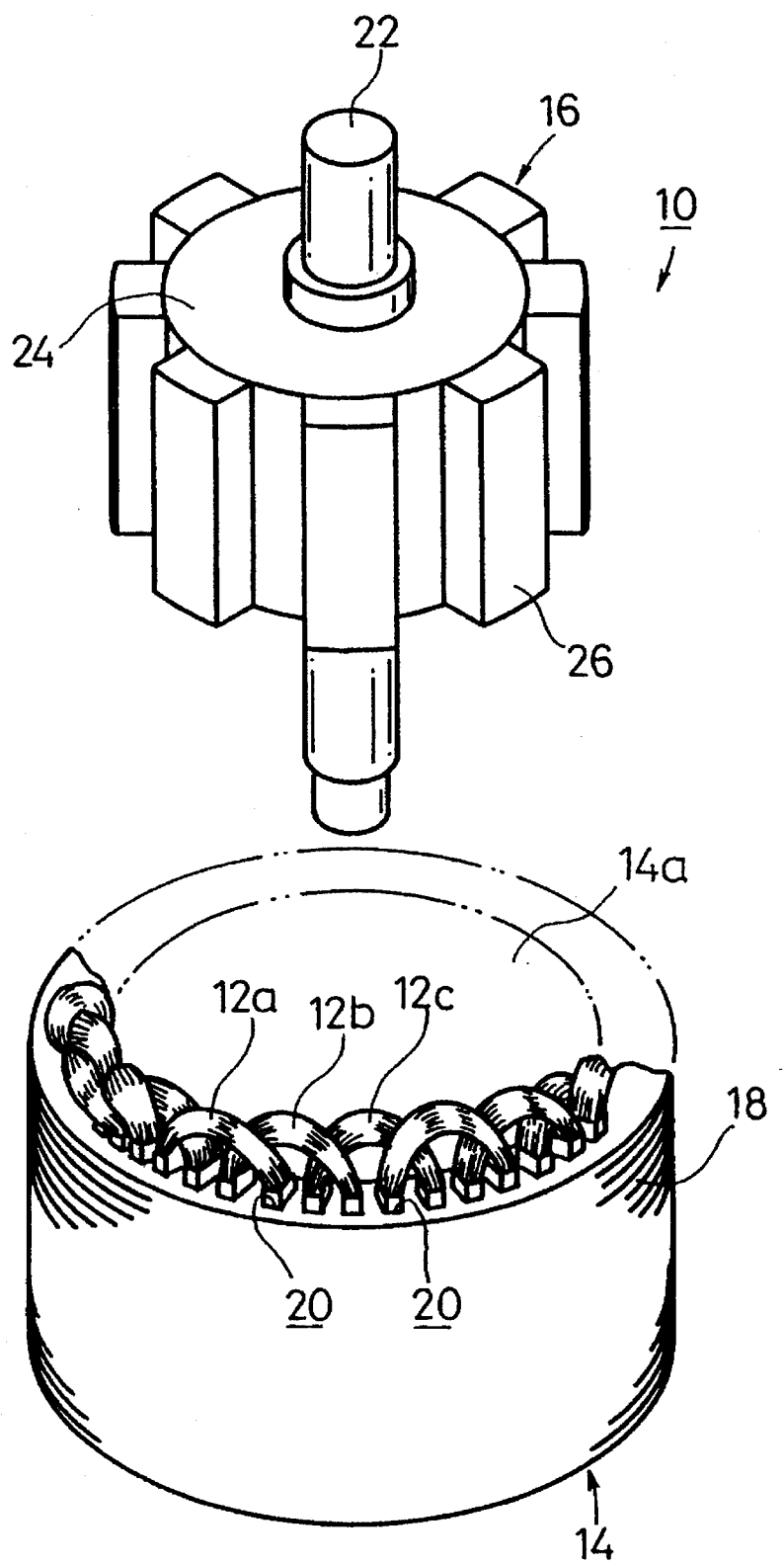
FIG. 1 is an exploded perspective view of an electric motor which incorporates wave windings produced by a wave winding forming device according to the present invention.

As shown in FIG. 1, an electric motor 10 comprises a stator core 14 in which there are mounted three-phase windings 12a~12c that are formed by a wave winding forming device 30 (see FIG. 2), and a rotor 16 rotatably disposed in a hollow space 14a in the stator core 14.

The stator core 14 is composed of a stack of steel sheets 18 joined integrally together, and has a plurality of slots 20 defined in its inner circumferential surface at angularly spaced intervals therealong and juxtaposed in the axial direction of the stator core 14. The windings 12a~12c are disposed in the slots 20. The rotor 16 comprises a shaft 22, a yoke 24 mounted on the shaft 22, and a plurality of permanent magnets 26 mounted on an outer circumferential surface of the yoke 24 at angularly spaced intervals therealong.

Figure 2:
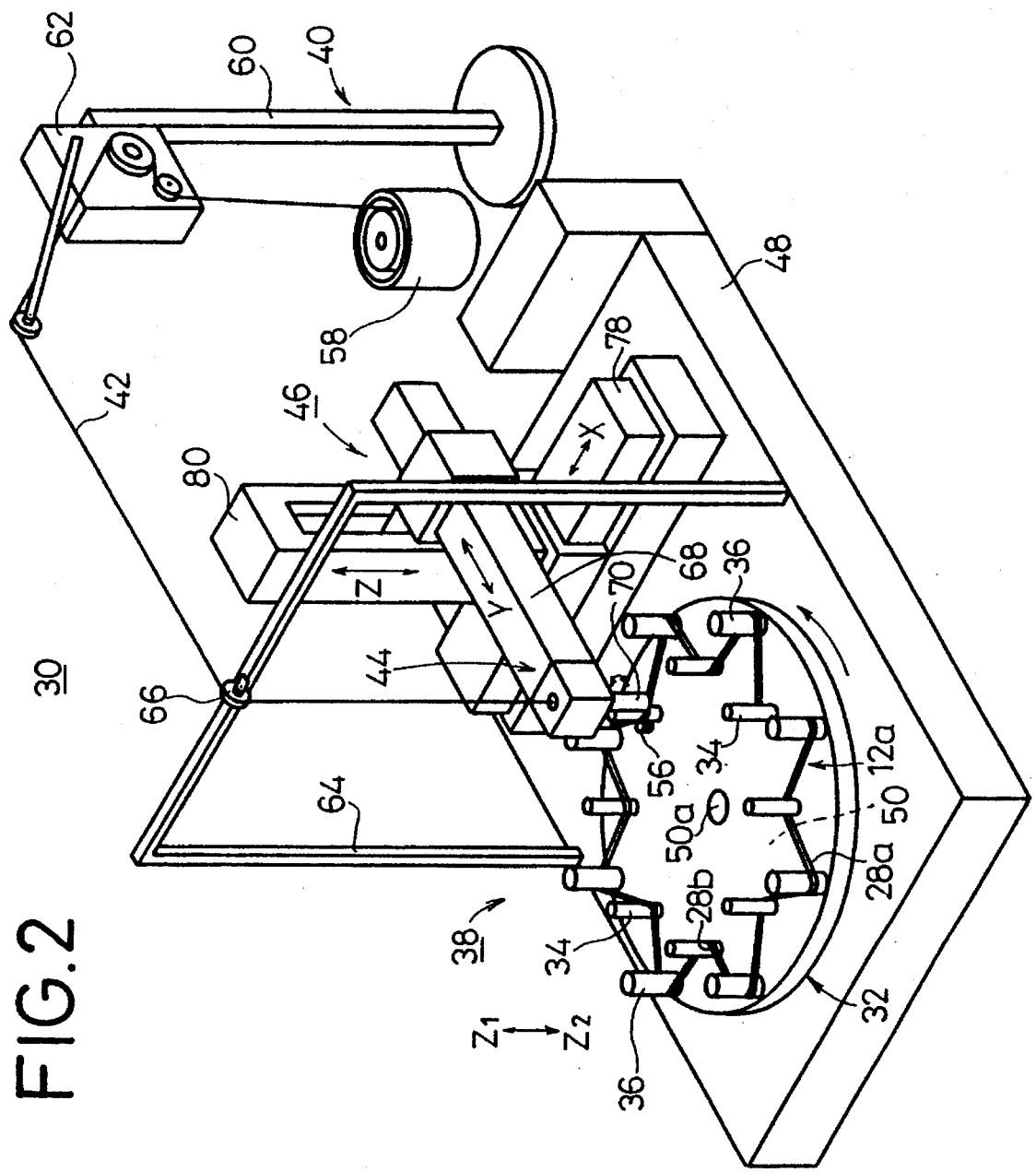
FIG. 2 is a perspective view of a wave winding forming device according to a first embodiment of the present invention.

As shown in FIG. 2, before the winding 12a is placed in the stator core 14, the winding 12 is of a wavy configuration including outwardly curved portions 28a and inwardly curved portions 28b alternating with the outwardly curved portions 28a. The winding 12a is inserted into the slots 20 such that the outwardly curved portions 28a are bent through about 90° in the direction indicated by the arrow $Z_2$ and the inwardly curved portions 28b are bent through about 90° in the direction indicated by the arrow $Z_1$. Since the windings 12b, 12c are of the same structure as the winding 12a, only the winding 12a will be described in detail below whereas the windings 12b, 12c will not be described in detail below.

1st Embodiment

Figure 3:
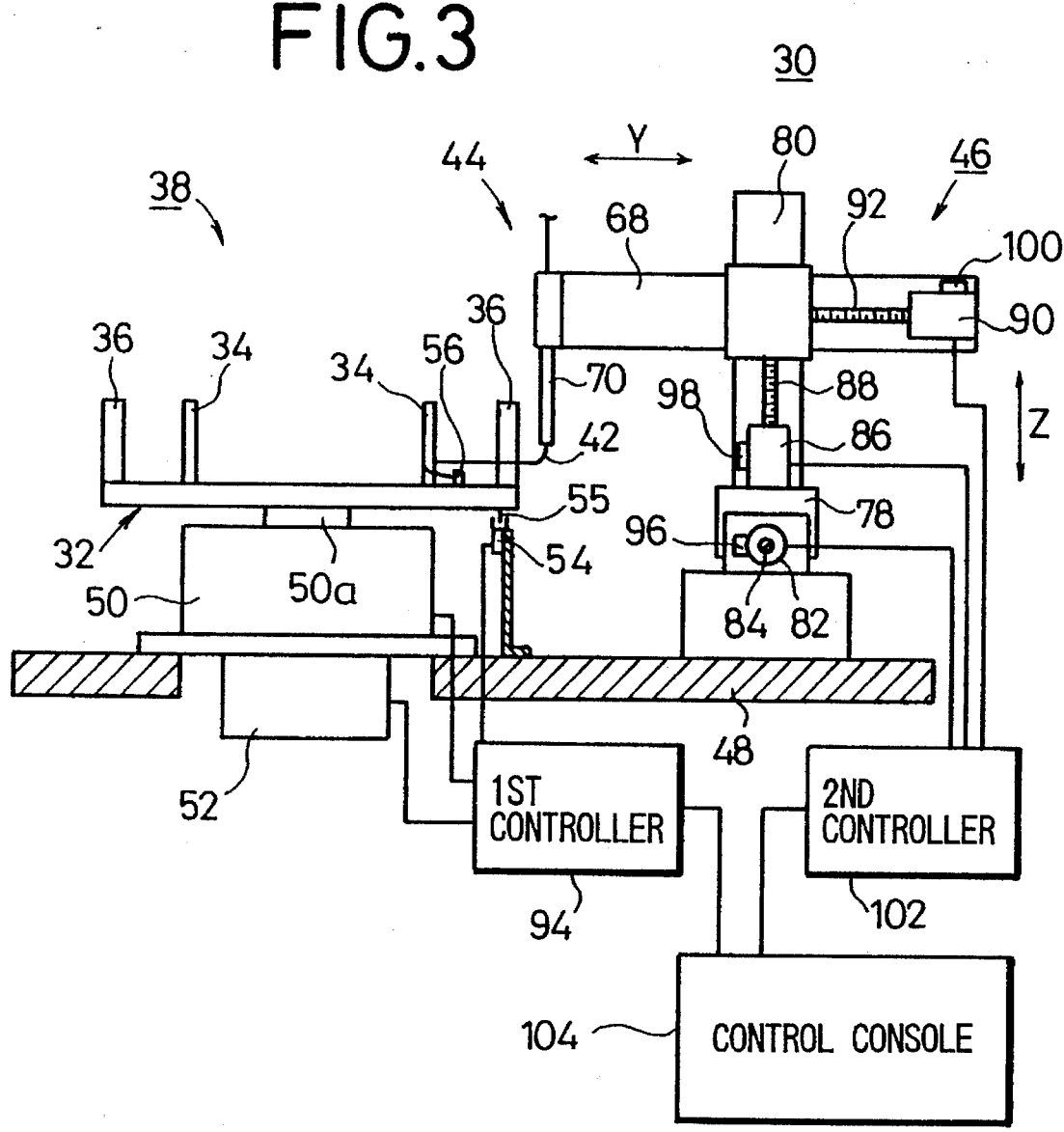
FIG. 3 is an elevational view, partly in block form, of the wave winding forming device according to the first embodiment.

As shown in FIGS. 2 and 3, a wave winding forming device 30 according to a first embodiment of the present invention comprises a winding jig 38 mounted on a turntable 32 and including a plurality of angularly spaced inner posts (first posts) 34 for forming inwardly curved portions 28b of a winding 12a and a plurality of angularly spaced outer posts (second posts) 36 for forming outwardly curved portions 28a of the winding 12a, a guide jig 44 for guiding an enameled wire (conductive wire) 42 supplied from a conductive wire supply 40 to the winding jig 38, and a displacing mechanism 46 for displacing the winding jig 38 and the guide jig 44 relatively to each other in axial and radial directions (indicated by the arrows X, Y, Z) of the turntable 32 to wind the enameled wire 42 guided by the guide jig 44 alternately around inner and outer circumferential surfaces of the respective inner and outer posts 34, 36 thereby to form the winding 12 in a wavy shape.

As shown in FIG. 3, the turntable 32 is fixedly mounted on a rotatable shaft 50a of a turning motor 50 securely mounted on a base 48 and coupled to a rotary encoder 52. An original position sensor 54 for detecting an original position of the turntable 32 is mounted on the base 48 for being engaged by a dog 55 that is fixed to a lower surface of the turntable 32. An engaging pin 56 for engaging the enameled wire 42 to establish a position to start winding the enameled wire 42 is fixedly mounted on the upper surface of the turntable 32.

As shown in FIG. 2, the conductive wire supply 40 has a casing 58 for storing a roll of enameled wire 42 therein. The enameled wire 42 unreeled from the casing 58 is fed through a tensioner 62 supported on a stand 60 to a guide roller 66 supported on a frame 64, from which the enameled wire 42 is directed downwardly and held by the guide jig 44.

Figure 4:
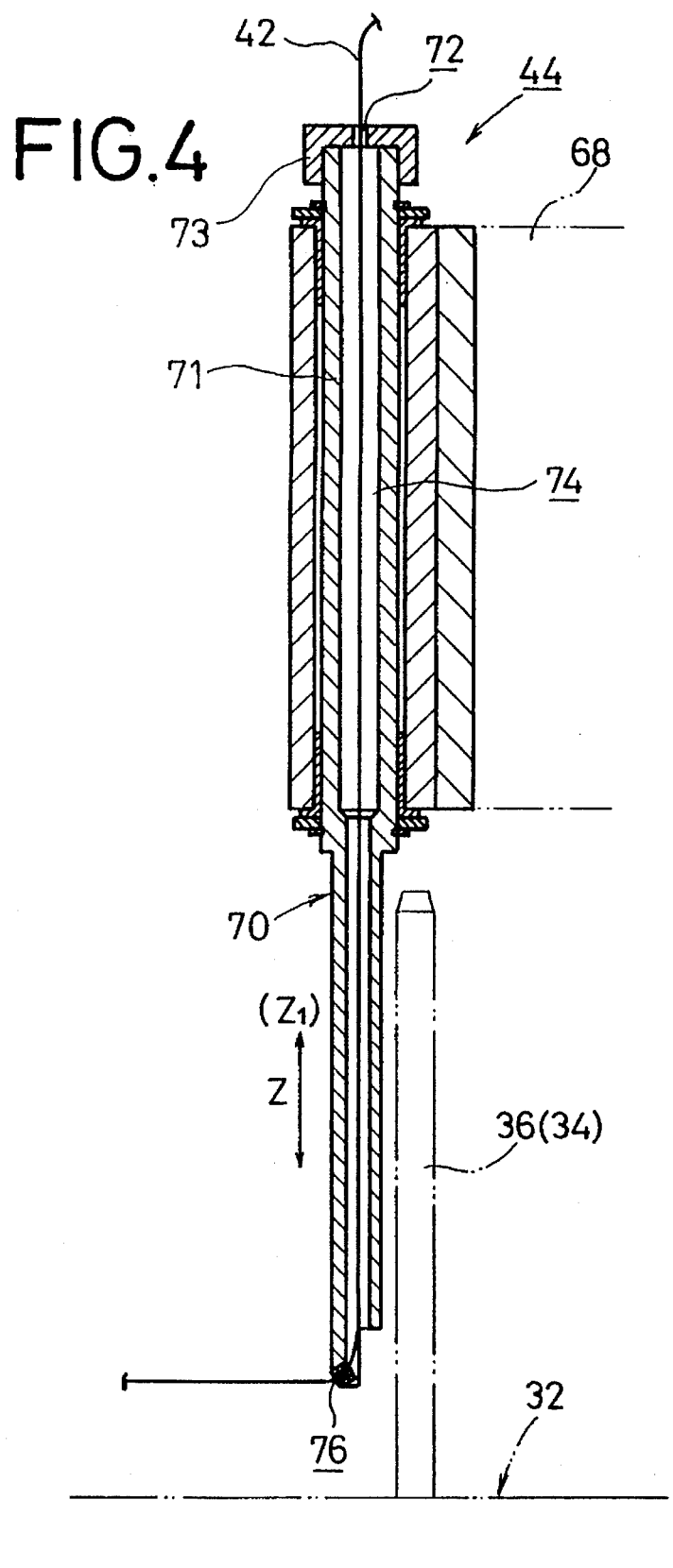
FIG. 4 is an enlarged vertical cross-sectional view of a nozzle of the wave winding forming device according to the first embodiment.

The guide jig 44 has a horizontal arm 68 with a nozzle 70 mounted on its distal end for rotation about a vertical axis along the direction indicated by the arrow Z (Z-axis). As shown in FIG. 4, the nozzle 70 has a cylindrical guide member 71, and a cap 73 fitted to an upper end of the guide member 71 and provided with an insertion hole 72 thereon. The insertion hole 72 communicates through a vertical passage 74 in the nozzle 70 with a nozzle outlet 76 at the lower end of the nozzle 70. The nozzle outlet 76 has an end surface inclined a certain angle to the horizontal direction.

As shown in FIGS. 2 and 3, the displacing mechanism 46 has a rail 78 elongated in the direction indicated by the arrow X (X-axis). A column 80 disposed on the rail 78 is vertically elongated, and can be moved back and forth along the X-axis by a horizontal ball screw 84 coupled to an X-axis motor 82. The column 80 houses therein a vertical ball screw 88 coupled to a Z-axis motor 86 for moving the horizontal arm 68 back and forth along the Z-axis in the vertical direction. The horizontal arm 68 houses therein a horizontal ball screw 92 coupled to a Y-axis motor 90 for moving the horizontal arm 68 back and forth in the direction indicated by the arrow Y (Y-axis). Therefore, the nozzle 70 mounted on the horizontal arm 68 is movable in three directions along the X-, Y-, and Z-axes, and is rotatable about the Z-axis.

As shown in FIG. 3, the turning motor 50, the rotary encoder 52, and the original position sensor 54 are electrically connected to a first controller 94. The X-axis motor 82, the Z-axis motor 86, and the Y-axis motor 90 are associated with respective position sensors 96, 98, 100 for detecting positions along the X-, Z-, and Y-axes, respectively. The X-axis motor 82, the Z-axis motor 86, the Y-axis motor 90, and the position sensors 96, 98, 100 are electrically connected to a second controller 102.

The first controller 94 stores a program for controlling rotation of the turning motor 50, and data on an angular displacement, a rotational speed, and a rotational acceleration for the turning motor 50 are specified for the program. The second controller 102 stores a program for moving the nozzle 70 to a desired position, and data on coordinates on the X-, Y-, and Z-axes, stroke speeds, and accelerations are specified for the program.

The first and second controllers 94, 102 are electrically connected to a control console 104. The control console 104 starts the programs of the first and second controllers 94, 102 according to a sequential ladder program, and starts a next program upon reception of completion signals of the programs of the first and second controllers 94, 102.

Operation of the wave winding forming device 30 thus constructed will be described below.

With the turntable 32 held in its original position based on a signal from the original position sensor 54, the tip end of the enameled wire 42 led from the nozzle 70 is secured to the engaging pin 56 on the turntable 32. When a program start signal is supplied from the control console 104 to the first controller 94, the turning motor 50 is energized to rotate the turntable 32 counterclockwise in the direction indicated by the arrow in FIG. 2. At the same time, the angular displacement of the turning motor 50 is detected by the rotary encoder 52.

When a program start signal is supplied from the control console 104 to the second controller 102, the X-axis motor 82, the Z-axis motor 86, and the Y-axis motor 90 are energized. Upon energization of the X-axis motor 82, the column 80 is displaced along the X-axis through the ball screw 84. Upon energization of the Z-axis motor 86, the horizontal arm 68 is displaced along the Z-axis through the ball screw 68. Upon energization of the Y-axis motor 90, the horizontal arm 68 is displaced along the Y-axis through the ball screw 92.

Therefore, the nozzle 70 mounted on the horizontal arm 68 can be moved three-dimensionally in the three directions along the X-, Z-, and Y-axes. Synchronized control of the turning motor 50, the X-axis motor 82, the Z-axis motor 86, and the Y-axis motor 90 enables the enameled wire 42 led from the nozzle outlet 76 of the nozzle 70 to move along a desired path.

Figure 5:
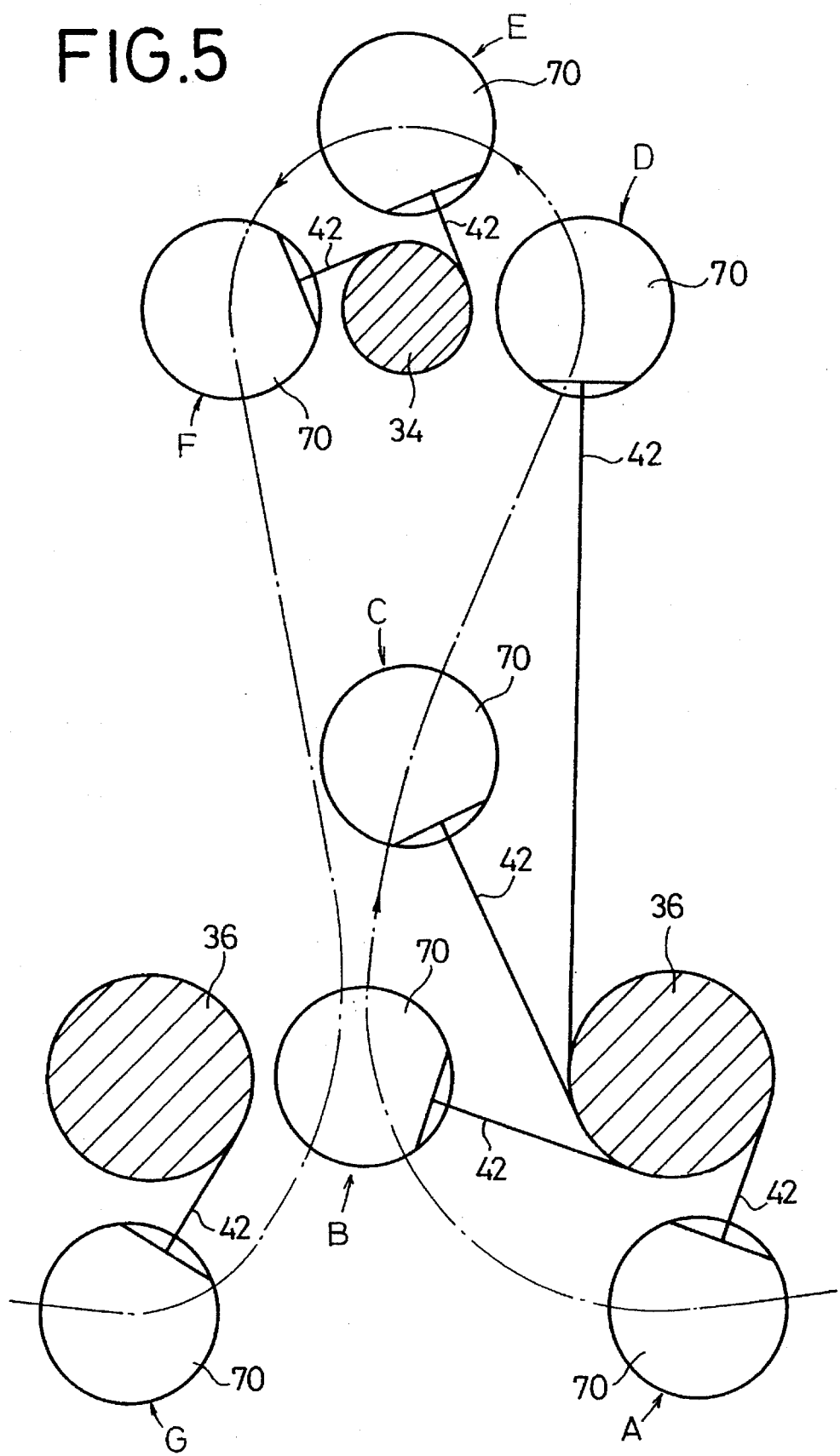
FIG. 5 is a view showing a path of movement of the nozzle.

More specifically, when the turntable 32 is rotated to displace one of the outer posts 36 closely to the nozzle 70, the nozzle 70 is moved radially outwardly of the outer post 36 with respect to the turntable 32 for thereby winding the enameled wire 42 around an outer circumferential surface of the outer post 36 (see the positions A, B in FIG. 5). When one of the inner posts 34 moves closely to the nozzle 70, the nozzle 70 is displaced radially inwardly toward the center of the turntable 32 (see the positions C~D in FIG. 5), and winds the enameled wire 42 around an inner circumferential surface of the inner post 34 (see the positions E, F in FIG. 5). Then, the nozzle 70 moves radially outwardly with respect to the turntable 32, starting to wind the enameled wire 42 around an outer circumferential surface of another one of the outer posts 36 (see the position G in FIG. 5). The nozzle 70 may be movable only along at least the Y- and Z-axes.

When the turntable 32 and the nozzle 70 are thus moved relatively to each other in a coordinated fashion, the enameled wire 42 is wound alternately around outer and inner circumferential surfaces of the outer and inner posts 36, 34. Each time the turntable 32 makes one revolution, the nozzle 70 and hence the enameled wire 42 led therefrom are displaced an increment upwardly in the direction indicated by the arrow $Z_1$. As a result, the enameled wire 42 is wound in a desired number of turns axially around the outer and inner posts 36, 34 upon continued rotation of the turntable 32.

The enameled wire 42 unreeled from the casing 58 is guided by the guide roller 66, introduced into the passage 74 through the insertion hole 72 of the nozzle 70, and drawn out of the nozzle outlet 76 while the enameled wire 42 is being tensioned by the tensioner 62. Therefore, the enameled wire 42 is not sagged when it is wound alternately around the outer and inner circumferential surfaces of the outer and inner posts 36, 34. Inasmuch as the nozzle outlet 76 is oriented tangentially to the outer and inner posts 36, 34 at all times when the enameled wire 42 is wound, as shown in FIG. 5, the nozzle outlet 76 is prevented from making one revolution when the enameled wire 42 is wound, and hence from being entangled with itself.

Consequently, the enameled wire 42 is formed into a winding 12a (see FIG. 2) which is of a wavy configuration including outwardly curved portions 28a and inwardly curved portions 28b alternating with the outwardly curved portions 28a. The terminal end of the winding 12a is cut off, and after the winding 12a is removed from the turntable 32, the winding 12a is inserted into some of the slots 20 of the stator core 14. Windings 12b, 12c which are shaped in the same manner as the winding 12a are also installed in the stator core 14.

In the first embodiment, the enameled wire 42 can be wound alternately around the outer and inner circumferential surfaces of the outer and inner posts 36, 34 simply when the turntable 32 with the outer and inner posts 36, 34 is rotated and the nozzle 70 is displaced at least along the Y- and Z-axes. Consequently, the windings 12a~12c of the desired wavy shape each with an alternate pattern of outwardly curved portions 28a and inwardly curved portions 28b are produced automatically and reliably.

Figure 24:
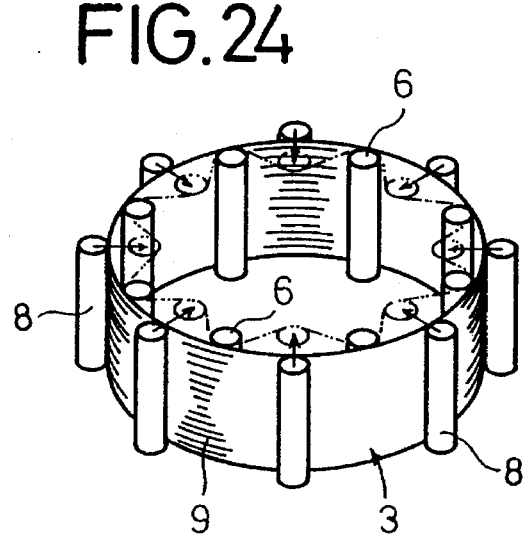
FIG. 24 is a perspective view illustrative of a conventional process of forming a wave winding.
Figure 26:
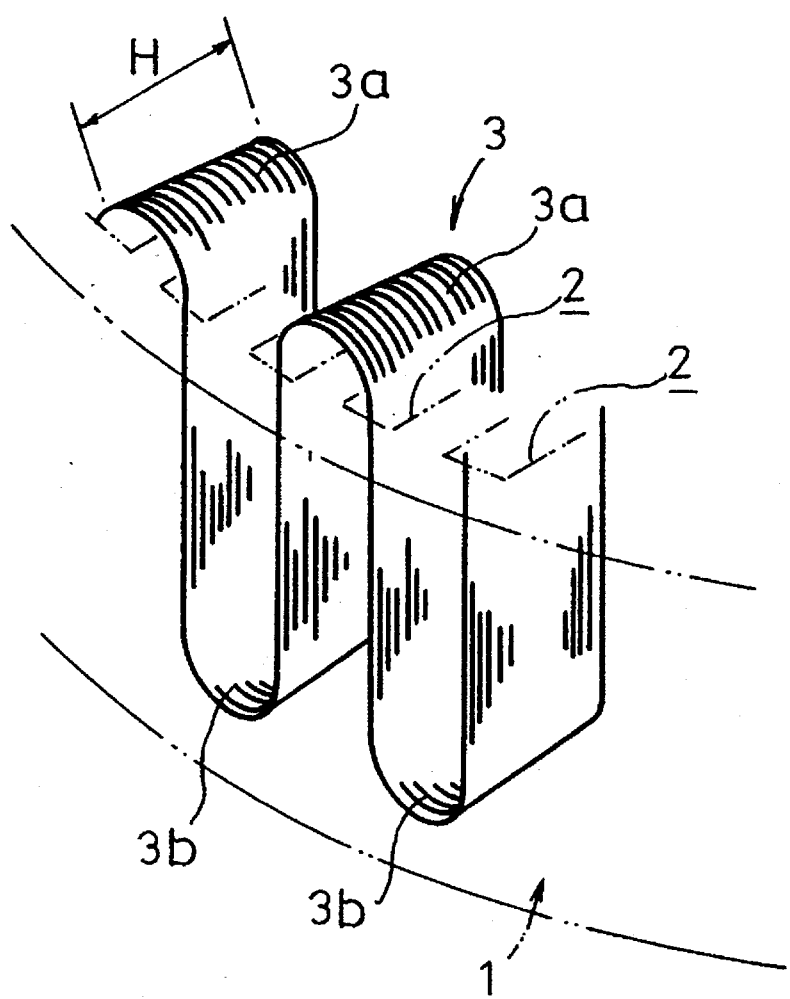
FIG. 26 is a fragmentary perspective view illustrative of the wave winding formed by the conventional process after it is inserted in the stator core.
Figure 27:
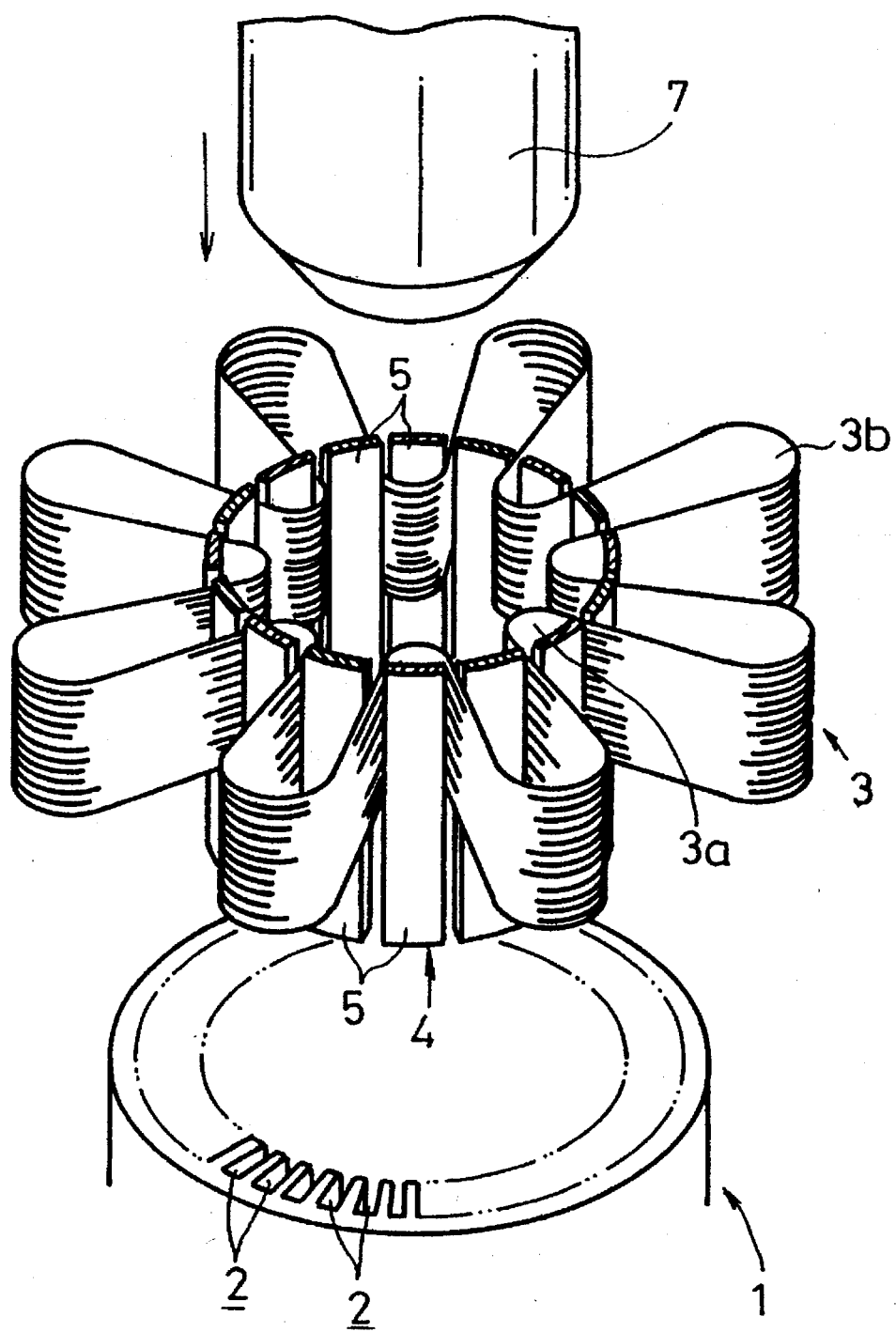
FIG. 27 is a fragmentary perspective view illustrative of the manner in which the wave winding is inserted into the stator core by a conventional inserting jig.

Therefore, the windings 12a~12c do not suffer excessive pressing forces and the insulating layer of the enameled wire 42 is reliably prevented from being damaged, unlike the conventional process in which the ring-shaped winding 3 is formed and thereafter shaped into a wavy configuration by the outer punches 8 which press the outer circumferential surface of the winding 3 as shown in FIG. 24. It is thus possible to effectively keep the desired quality of the windings 12a~12c, and shape the windings 12a~12c into the desired form efficiently and easily.

2nd Embodiment

Figure 6:
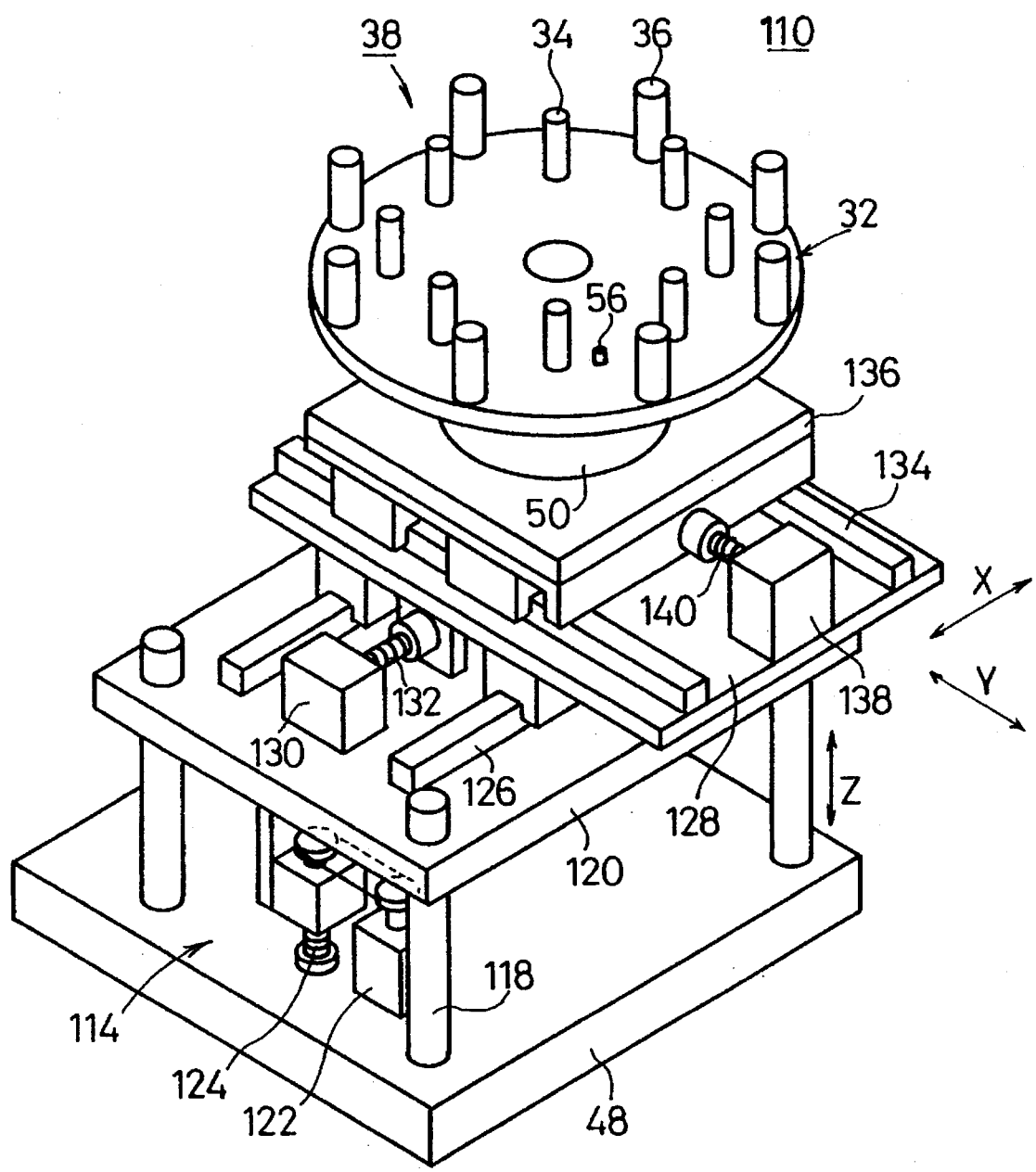
FIG. 6 is a perspective view of a wave winding forming device according to a second embodiment of the present invention.
Figure 7:
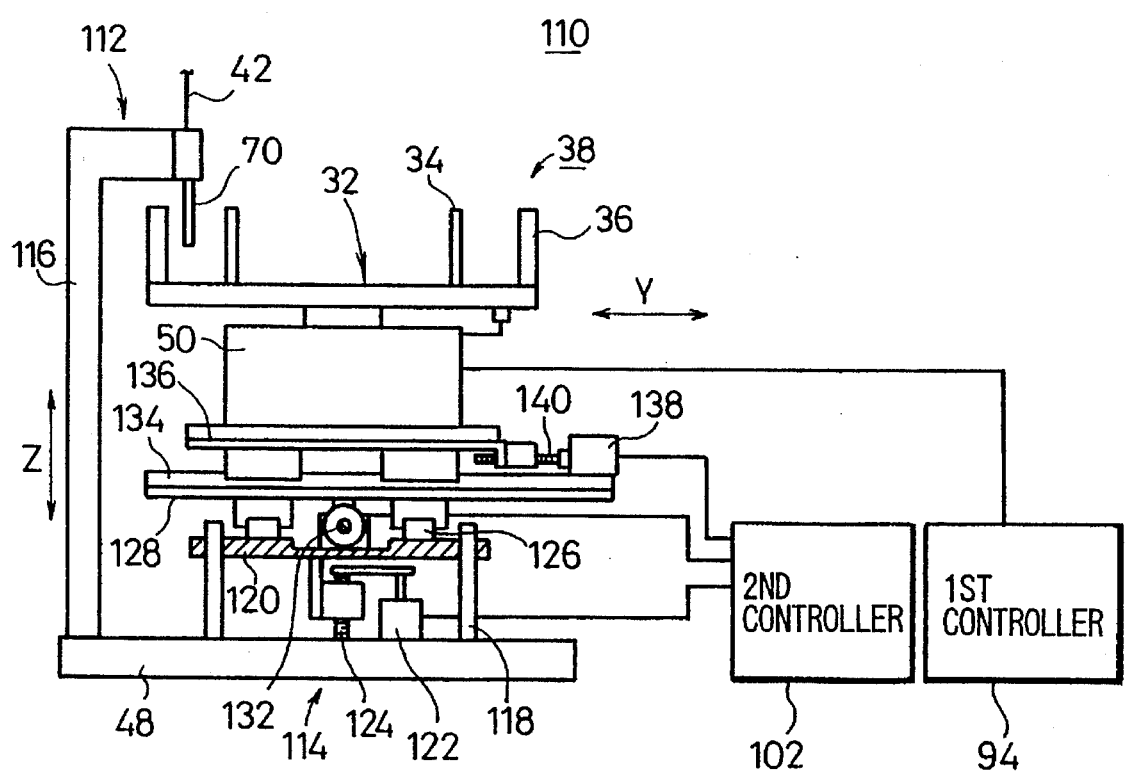
FIG. 7 is an elevational view, partly in block form, of the wave winding forming device according to the second embodiment.

A wave winding forming device 110 according to a second embodiment will be described below with reference to FIGS. 6 and 7. Those parts of the wave winding forming device 110 which are identical to those of the wave winding forming device 30 according to the first embodiment are denoted by identical reference numerals, and will not be described in detail below.

The wave winding forming device 110 comprises a winding jig 38, a guide jig 112, and a displacing mechanism 114 for displacing the winding jig 38 in the three directions of X-, Y-, and Z-axes, or at least in the two directions of Y- and Z-axes. The guide jig 112 has a support frame 116 fixed to a base 48, and a nozzle 70 is rotatably supported on the support frame 116 (see FIG. 7).

The displacing mechanism 114 has a Z-axis table 120 guided by a plurality of guide rods 118 vertically disposed on the base 48. The Z-axis table 120 can be moved vertically along the guide rods 118 by a Z-axis motor 122 through a ball screw 124 on the base 48. On the Z-axis table 120, there is mounted an X-axis table 128 by a pair of guide rails 126 for movement along the X-axis by an X-axis motor 130 and a ball screw 132 mounted on the Z-axis table 120. The X-axis table 128 supports thereon a Y-axis table 136 through a pair of guide rails 134 for movement along the Y-axis by a Y-axis motor 138 and a ball screw 140 mounted on the X-axis table 128. A turntable 32 with inner and outer posts 34, 36 and an engaging pin 56 mounted thereon is rotatably mounted on the Y-axis table 136 through a turning motor 50 which rotates the turntable 32.

The turning motor 50 is electrically connected to a first controller 94, and the Z-axis motor 122, the X-axis motor 130, and the Y-axis motor 138 are electrically connected to a second controller 102.

The wave winding forming device 110 operates as follows: At the same time that the turntable 32 is rotated, the Z-axis motor 122, the X-axis motor 130, and the Y-axis motor 138 are energized to move the Z-axis table 120, the X-axis table 128, and the Y-axis table 136 respectively along the Z-, X-, and Y-axes. Therefore, the turntable 32, while it is being rotated, can be moved selectively along the Z-, X-, and Y-axes for winding the enameled wire 42 drawn from the nozzle 70 fixedly supported in position by the support frame 116, alternately around the outer and inner circumferential surfaces of the outer and inner posts 36, 34. Consequently, the windings 12a~12c of the desired wavy configuration can automatically be formed.

In the second embodiment, it is possible to prevent the insulating layer of the enameled wire 42 from being damaged, to form the windings 12a–12c of high quality, and to shape the windings 12a–12c into the desired form efficiently and easily, as with the first embodiment.

Figure 8:
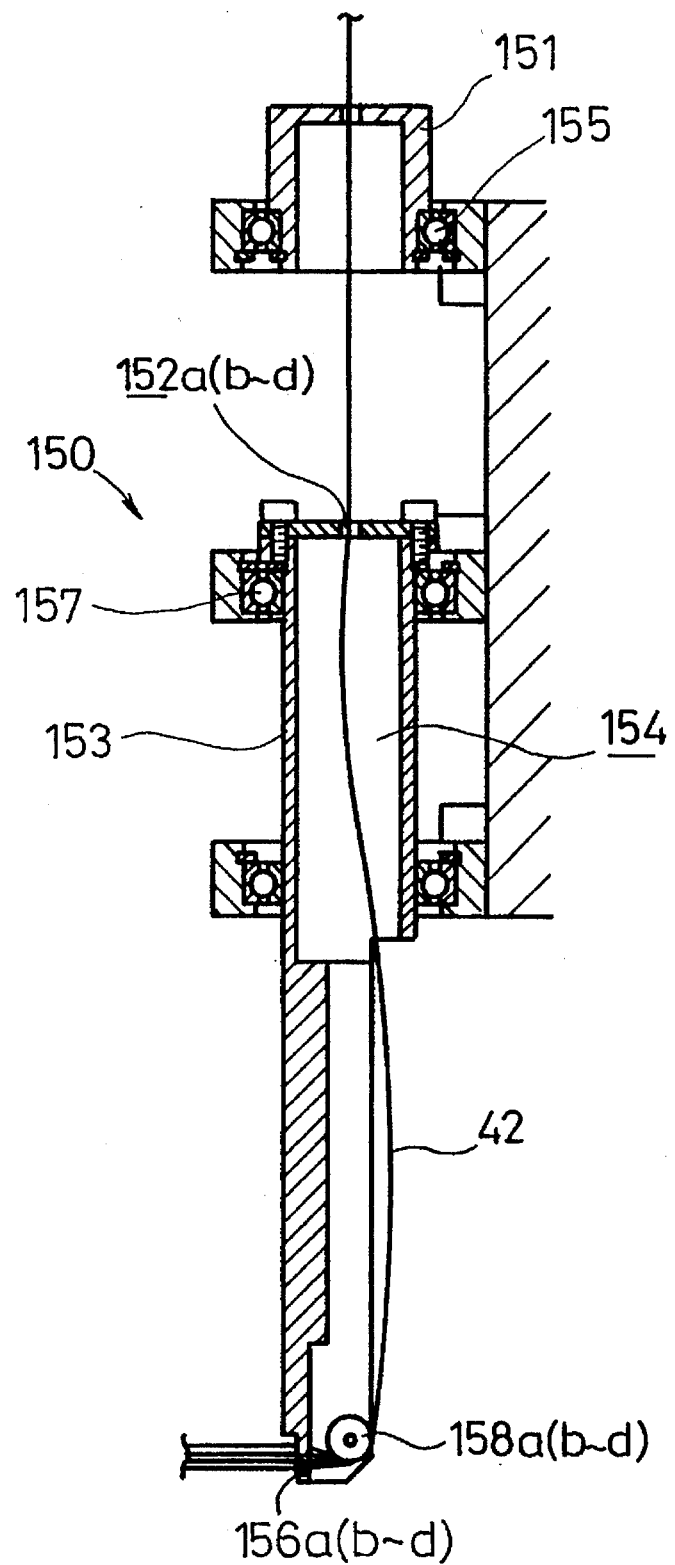
FIG. 8 is an enlarged vertical cross-sectional view of another nozzle for simultaneously supplying four enameled wires.
Figure 9:
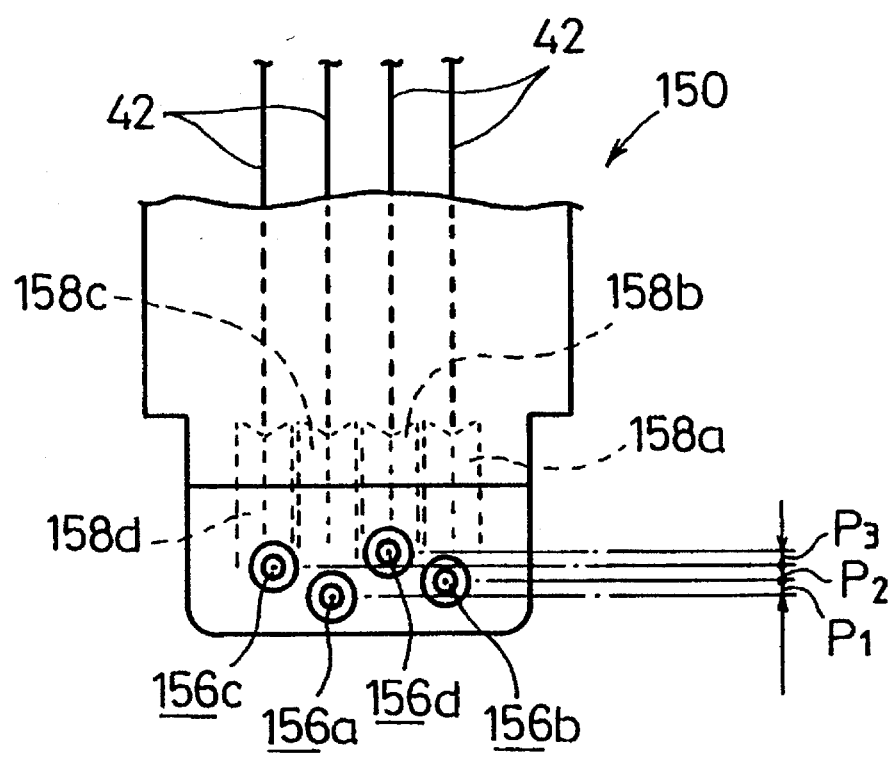
FIG. 9 is a fragmentary front elevational view of the nozzle shown in FIG. 8.

In the first and second embodiments, the nozzle 70 is arranged to guide the single enameled wire 42. However, it may be arranged to simultaneously guide a plurality of enameled wires 42. For example, FIGS. 8 and 9 show another nozzle 150 having four insertion holes 152a–152d defined in its upper end for simultaneously guiding four enameled wires 42. The nozzle 150 has a first guide member 151 and a second guide member 153 disposed below the first guide member 151 with a predetermined space therefrom. The first and second guide members 151, 153 being rotatably held by ball bearings 155, 157, respectively. The second guide member 153 has a passage 154 defined vertically therein in communication with the insertion holes 152a–152d, and four nozzle outlets 156a–156d defined in the lower end of the second guide member 153 in communication with the passage 154, the nozzle outlets 156a–156d being oriented horizontally.

As shown in FIG. 9, the nozzle outlets 156a–156d are vertically staggered to minimize pitches or spacings $P_1$–$P_3$ between the nozzle outlets 156a–156d. Therefore, the four enameled wires 42 are wound around the outer and inner circumferential surfaces of the outer and inner posts 36, 34 at minimum spaced intervals in their axial direction.

Four guide rollers 158a–158d are rotatably disposed in the nozzle 150 in the vicinity of the respective nozzle outlets 156a–156d for directing the respective enameled wires 42 horizontally out of the nozzle outlets 156a–156d. The guide rollers 158a–158d are also effective to reduce damage to the insulating layers of the enameled wires 42.

Because the nozzle 150 can simultaneously supply four enameled wires 42, the windings 12a–12c can be produced highly efficiently.

Figure 10:
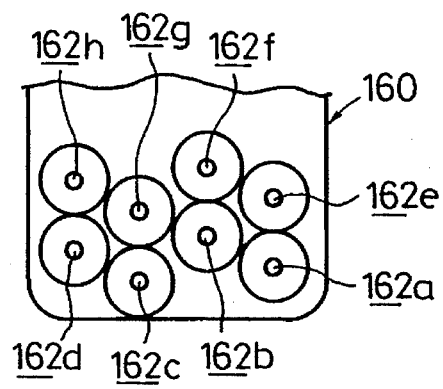
FIG. 10 is a fragmentary front elevational view of still another nozzle for simultaneously supplying eight enameled wires.
Figure 11:
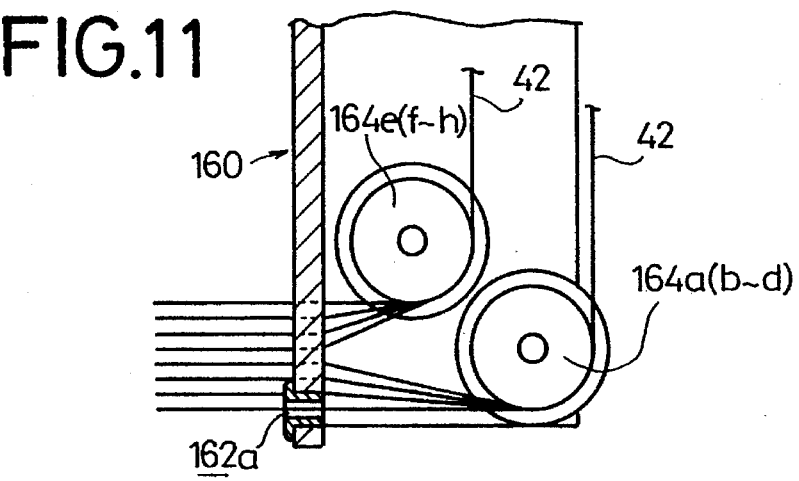
FIG. 11 is a side elevational view, partly in vertical cross section, of the nozzle shown in FIG. 10.

FIGS. 10 and 11 illustrate still another nozzle 160 having eight nozzle outlets 162a–162h arranged in a staggered pattern for simultaneously supplying eight enameled wires 42. The nozzle 160 also has two arrays of guide rollers 164a–164d, 164e–164h arranged in upper and lower rows positioned closely to the nozzle outlets 162a–162h for guiding the respective enameled wires 42.

Figure 12:
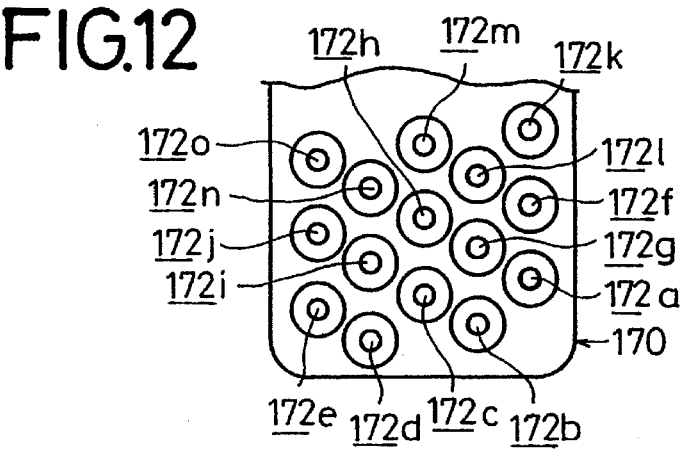
FIG. 12 is a fragmentary front elevational view of a further nozzle for simultaneously supplying fifteen enameled wires.
Figure 13:
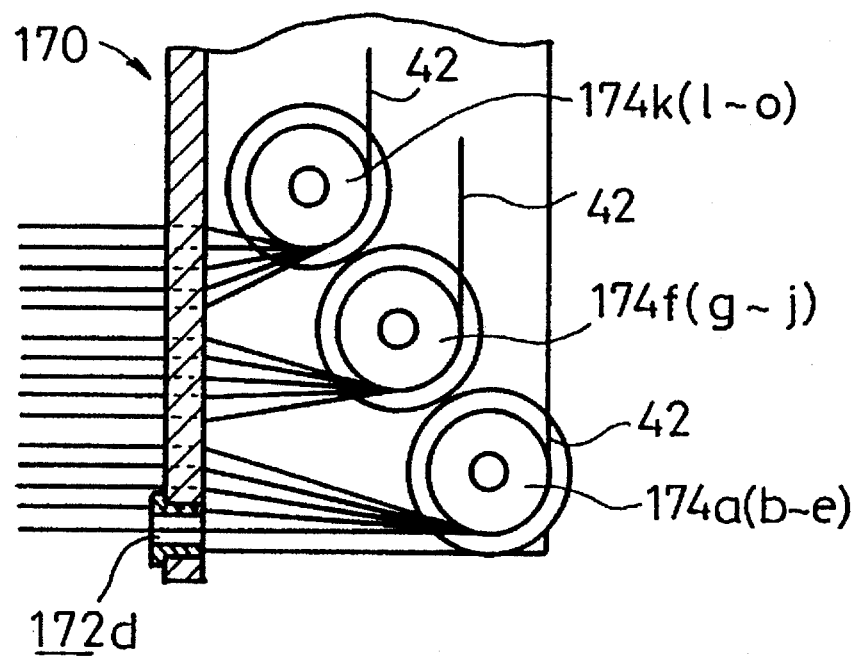
FIG. 13 a side elevational view, partly in vertical cross section, of the nozzle shown in FIG. 12.

FIGS. 12 and 13 show a further nozzle 170 having fifteen nozzle outlets 172a–172o arranged in a staggered pattern for simultaneously supplying fifteen enameled wires 42. The nozzle 170 also has three arrays of guide rollers 174a–174e, 174f–174j, 174k–174o arranged in upper, middle and lower rows positioned closely to the nozzle outlets 172a–172o for guiding the respective enameled wires 42.

3rd Embodiment

Figure 14:
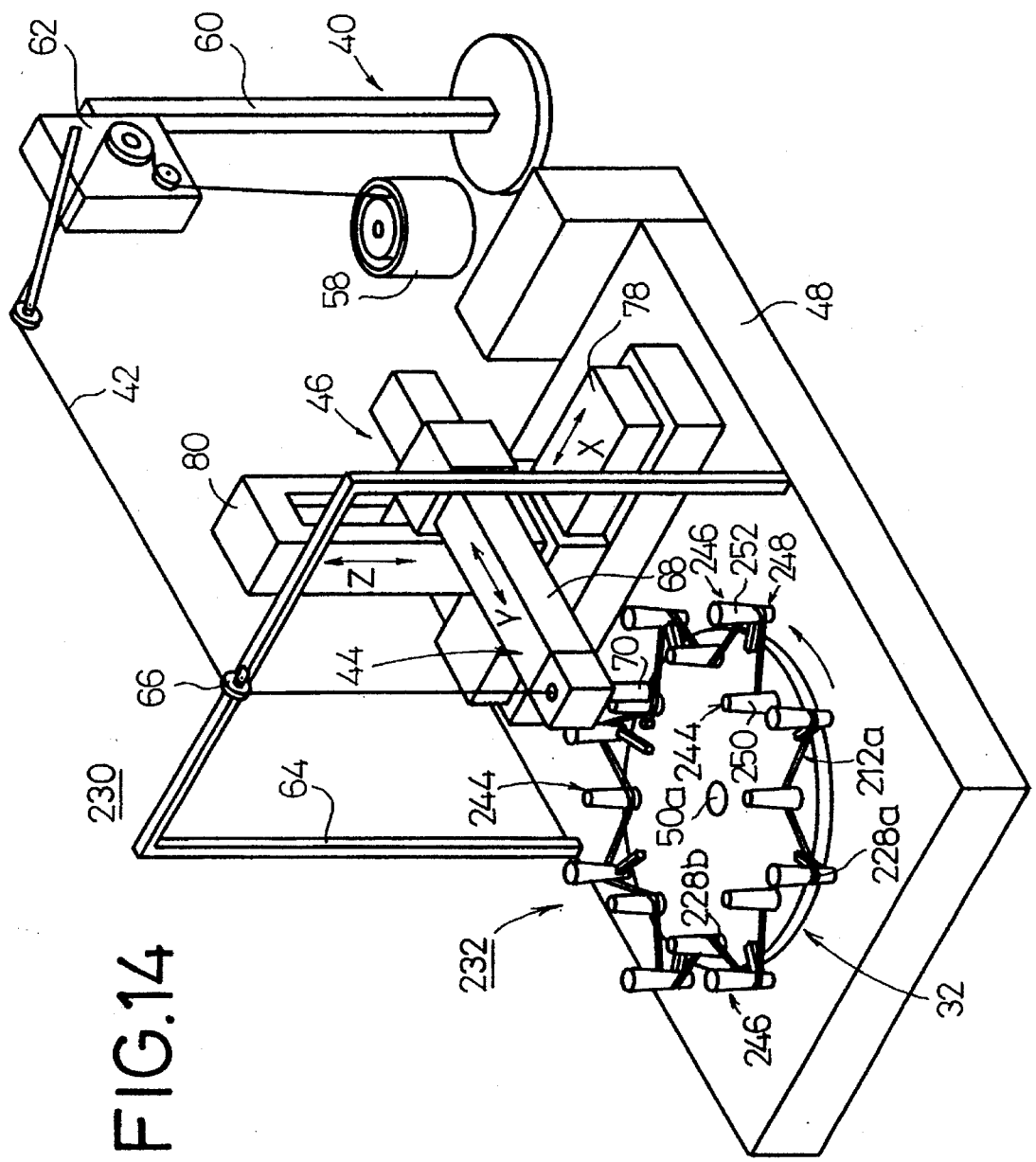
FIG. 14 is a perspective view of a wave winding forming device which incorporates a wave winding forming jig according to a third embodiment of the present invention.
Figure 15:
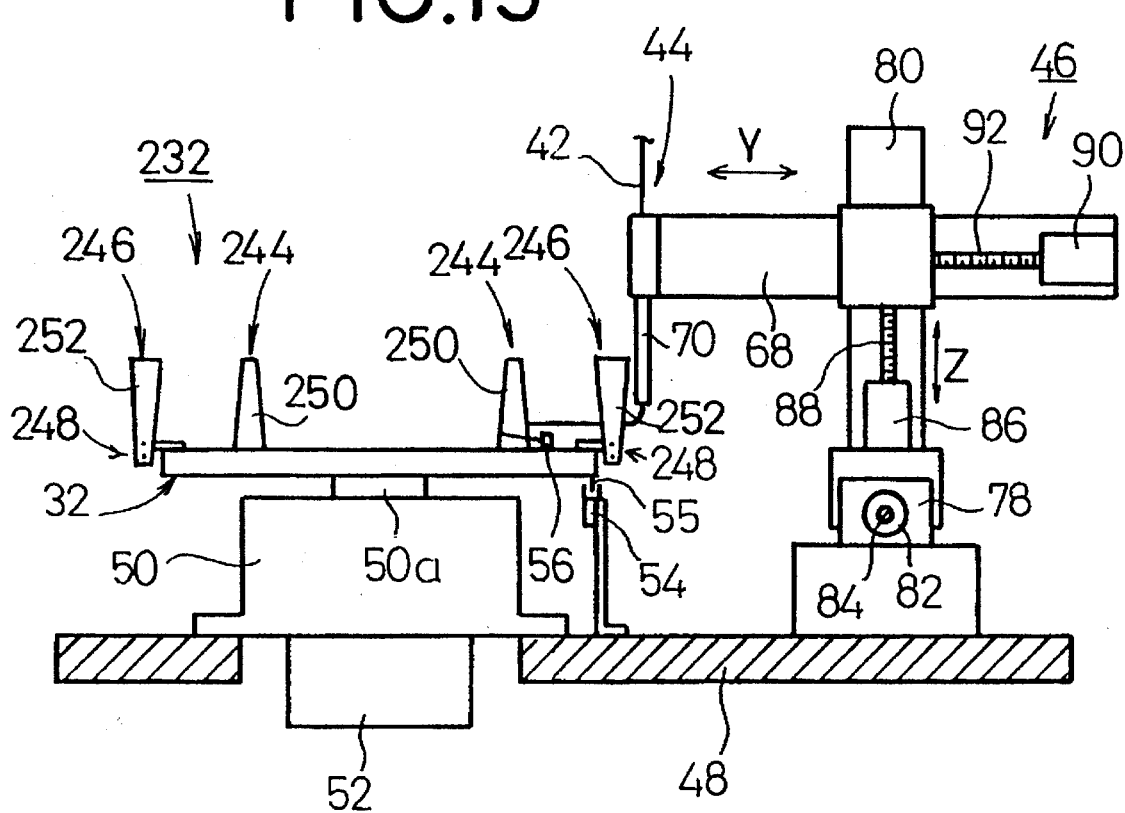
FIG. 15 is a side elevational view of the wave winding forming device shown in FIG. 14.

FIGS. 14 and 15 show a wave winding forming device 230 which incorporates a winding jig 232 according to a third embodiment of the present invention. Those parts of the wave winding forming device 230 which are identical to those of the wave winding forming device 30 are denoted by identical reference numerals, and will not be described in detail below.

The winding jig 232 comprises a plurality of angularly spaced inner posts (first posts) 244 for forming inwardly curved portions 228b of a winding 212a , a plurality of angularly spaced outer posts (second posts) 246 for forming outwardly curved portions 228a of the winding 12a , and tilting means 248 for tilting the outer posts 246 toward the center of a turntable 32. The inner posts 244, the outer posts 246, and the tilting means 248 are mounted on the turntable 32.

The inner posts 244 are positioned on a hypothetical circle around the center of the turntable 32, and have respective tapered surfaces (varying-diameter outer circumferential surfaces) 250 whose diameter decreases progressively toward their upper ends. Specifically, each of the inner posts 244 has a radius of 15 mm at its lower end and a radius of 11 mm at its upper end, with a tapering ratio of 1/10.

Figure 16:
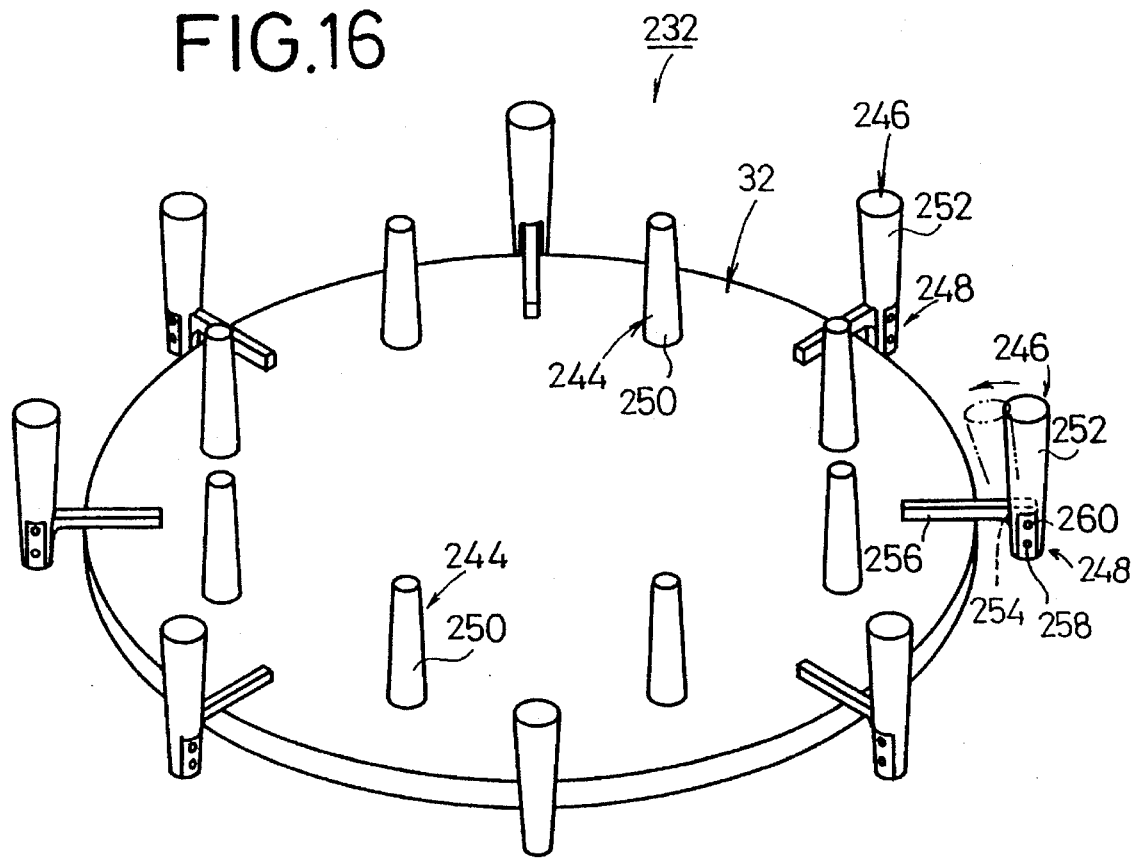
FIG. 16 is a perspective view of inner posts, outer posts, and tilting means of the wave winding forming jig shown in FIG. 14.

As shown in FIG. 16, the outer posts 246 are positioned on a hypothetical circle around the center of the turntable 32 radially outward of the inner posts 244. The outer posts 246 have respective tapered surfaces (varying-diameter outer circumferential surfaces) 252 whose diameter increases progressively toward their upper ends. The outer posts 246 have respective openings 254 defined diametrically therein and extending axially a certain length from their lower ends.

The tilting means 248 comprise respective substantially L-shaped attachments 256 having ends fixed to an outer circumferential edge portion of the turntable 32. The substantially L-shaped attachments 256 include outer ends extending downwardly and disposed in the respective openings 254 of the outer posts 246. Pins 258 are fixed to the respective lower ends of the outer posts 246 and extend through the downwardly extending outer ends of the substantially L-shaped attachments 256. The outer posts 256 are tiltable about the respective pins 258 toward the center of the turntable 32. Plungers 260 are removably mounted in the respective outer posts 246 at positions above the pins 258. When the plungers 260 are inserted into respective holes (not shown) defined in the attachments 256, the outer posts 246 are maintained in a vertical position as indicated by the solid lines in FIG. 16.

When the turntable 32 and the nozzle 286 are moved relatively to each other in a coordinated fashion, the enameled wire 42 is wound alternately around outer and inner circumferential surfaces of the outer and inner posts 246, 244. Each time the turntable 32 makes one revolution, the nozzle 286 and hence the enameled wire 42 led therefrom are displaced an increment upwardly in the direction along the Z-axis. As a result, the enameled wire 42 is wound in a desired number of turns axially around the outer and inner posts 246, 244 upon continued rotation of the turntable 32.

Consequently, the enameled wire 42 is formed into a winding 212a which is of a wavy configuration including outwardly curved portions 228a and inwardly curved portions 228b alternating with the outwardly curved portions 228a. The terminal end of the winding 212a is cut off, and then the winding 212a is removed from the turntable 32. At this time, the plungers 260 of the tilting means 248 are removed from the attachments 256, allowing the outer posts 246 to be tilted toward the center of the turntable 32. When the winding 212a is pulled upwardly for removal from the turntable 32, the outer posts 246 are tilted toward the center of the turntable 32 as indicated by the two-dot-dash lines in FIG. 16. With the outer posts 246 tilted toward the center of the turntable 32, the winding 212a can smoothly be taken away from the turntable 32 without being obstructed by the tapered surfaces 242 of the outer posts 246.

Figure 17:
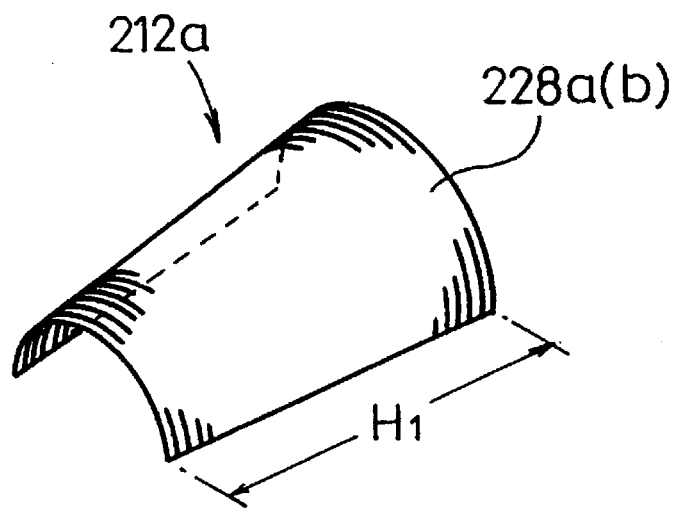
FIG. 17 is a perspective view of a portion of a winding formed by the wave winding forming jig shown in FIG. 14.
Figure 18:
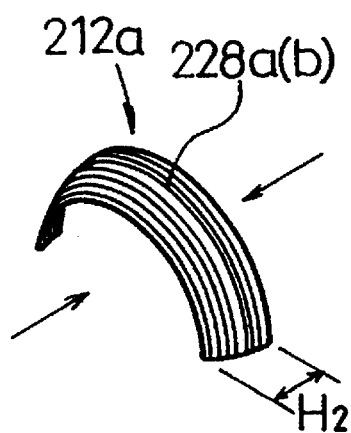
FIG. 18 is a perspective view of the portion of the winding which has been pressed transversely.

In the third embodiment, the winding 212a of the wavy configuration is formed when the enameled wire 42 are wound alternately around the inner and outer posts 244, 246 which have the tapered surfaces 250, 252 that are inclined in the respective opposite directions. Consequently, each of the outwardly curved portions 228a and the inwardly curved portions 228b of the winding 212a has its curvature varied in the transverse direction (axial direction) of the winding 212a as illustrated in FIG. 17. When the wiring 12a is subsequently pressed transversely for insertion into some of the slots 20 of the stator core 14, the turns of the enameled wire 42 of the winding 212a are gathered into an overlapping compact condition to reduce the entire width of the winding 212a from $H_1$ (FIG. 17) to $H_2$ (FIG. 18).

When the compacted winding 212a is inserted into some of the slots 20 of the stator core 14, the turns of the enameled wire 42 are bundled in the slots 20. As a result, the space factor of the winding 212a in the slots 20 is greatly increased, making it possible to reduce the size of the electric motor 10 and design the electric motor 10 for higher performance.

The windings 212b, 212c which are formed in the same manner as the winding 212a are inserted into the other slots 20 of the stator core 14.

4th Embodiment

Figure 19:
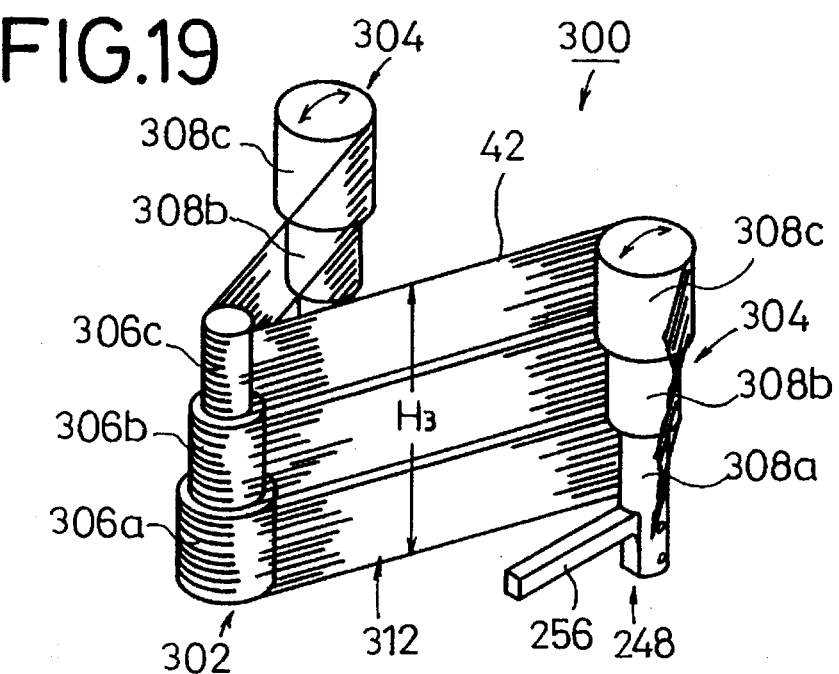
FIG. 19 is a perspective view of a portion of a wave winding forming jig according to a fourth embodiment of the present invention.

FIG. 19 shows a winding jig 300 according to a fourth embodiment of the present invention. Those parts of the winding jig 300 which are identical to those of the winding jig 232 according to the third embodiment are denoted by identical reference numerals, and will not be described in detail below. The winding jig 300 comprises a plurality of angularly spaced inner posts (first posts) 302, a plurality of angularly spaced outer posts (second posts) 304, and tilting means 248 for tilting the outer posts 304 toward the center of a turntable 32. The inner posts 302, the outer posts 304, and the tilting means 248 are mounted on the turntable 32.

Each of the inner posts 302 is of a stepped shape having an axial succession of outer circumferential surfaces (varying-diameter outer circumferential surfaces) 306a~306c whose diameter decreases progressively toward its upper end. Specifically, the outer circumferential surfaces 306a~306c have respective radii of 13 mm, 12.5 mm, and 12 mm. Each of the outer posts 304 is also of a stepped shape having an axial succession of outer circumferential surfaces (varying-diameter outer circumferential surfaces) 308a~308c whose diameter increases progressively toward its upper end.

When an enameled wire 42 is wound alternately around the inner and outer posts 302, 304, a winding 312 of wavy shape is produced which is composed of three different turn regions of the enameled wire 42 having different curvatures that vary successively in the transverse direction (axial direction) of the winding 312. Upon being pressed transversely, the turn regions of the enameled wire 42 overlap each other thereby to reduce the entire width of the winding 312 from $H_3$ to about one-third of $H_3$. Therefore, the space factor of the winding 312 in the slots 20 is increased.

5th Embodiment

Figure 20:
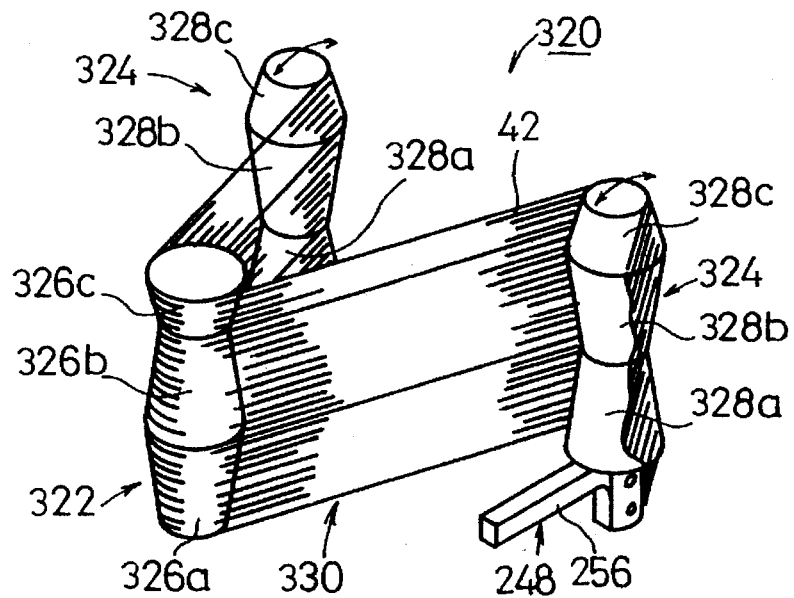
FIG. 20 is a perspective view of a portion of a wave winding forming jig according to a fifth embodiment of the present invention.

FIG. 20 illustrates a winding jig 320 according to a fifth embodiment of the present invention. Those parts of the winding jig 320 which are identical to those of the winding jig 232 according to the third embodiment are denoted by identical reference numerals, and will not be described in detail below. The winding jig 320 comprises a plurality of angularly spaced inner posts (first posts) 322, a plurality of angularly spaced outer posts (second posts) 324, and tilting means 248 for tilting the outer posts 324 toward the center of a turntable 32. The inner posts 322, the outer posts 324, and the tilting means 248 are mounted on the turntable 32.

Each of the inner posts 322 has a composite tapered configuration including a first tapered surface 326a progressively greater in diameter toward its upper end, a second tapered surface (varying-diameter outer circumferential surface) 326b progressively smaller in diameter from the end of the first tapered surface 326a toward the upper end of the inner post 322, and a shorter third tapered surface 326c progressively larger in diameter from the end of the second tapered surface 326b toward the upper end of the inner post 322. Specifically, the first tapered surface 326a has a maximum diameter of 30 mm, the second tapered surface 326b has a minimum diameter of 22 mm, and the third tapered surface 326c has a maximum diameter of 26 mm.

Each of the outer posts 324 has a first tapered surface 328a progressively smaller in diameter toward its upper end, a second tapered surface (varying-diameter outer circumferential surface) 328b progressively greater in diameter from the end of the first tapered surface 328a toward the upper end of the outer post 324, and a shorter third tapered surface 328c progressively smaller in diameter from the end of the second tapered surface 328b toward the upper end of the outer post 324.

When an enameled wire 42 is wound alternately around the inner and outer posts 322, 324, a winding 330 of wavy shape is produced which has its curvature varied continuously in the transverse direction (axial direction) of the winding 330. Therefore, the width of the winding 330 can easily be reduced upon being inserted into the slots 20 of the stator core 14. The winding jig 320 according to the fifth embodiment thus offers the same advantages as those of the winding jigs 232, 300 according to the third and fourth embodiments.

6th Embodiment

Figure 21:
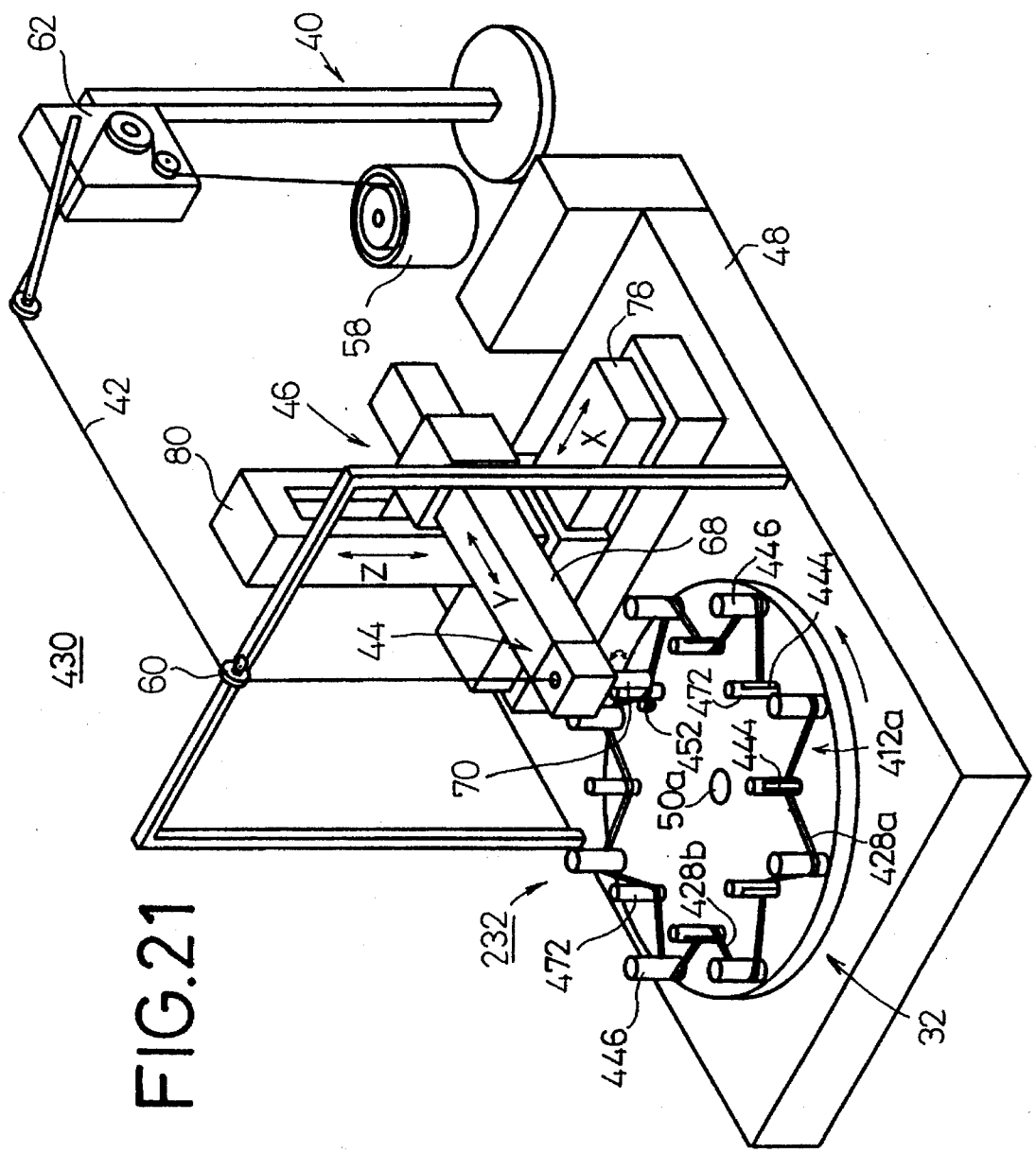
FIG. 21 is a perspective view of a wave winding forming device which incorporates a wave winding holding jig according to a sixth embodiment of the present invention.
Figure 23:
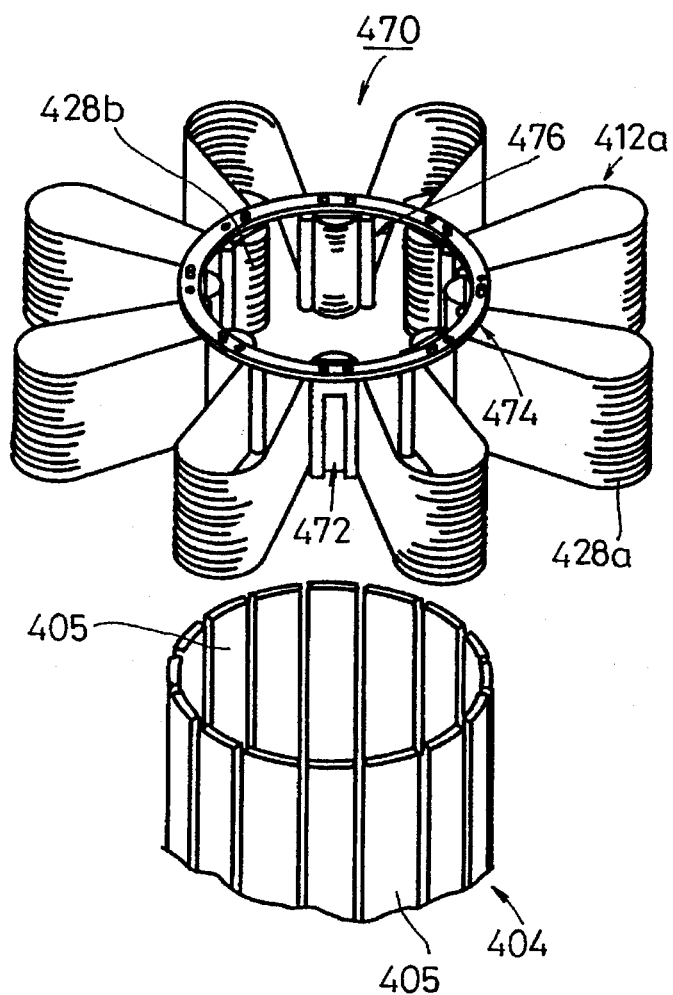
FIG. 23 is a fragmentary perspective view showing a winding held by the wave winding holding jig according to the sixth embodiment.

FIG. 21 shows a wave winding forming device 430 which incorporates a wave winding holding jig 470 shown in FIG. 22 according to a sixth embodiment of the present invention. The wave winding holding jig 470 is also shown in FIGS. 22 and 23. Those parts of the wave winding forming device 430 other than the wave winding holding jig 470 are identical to those of the wave winding forming device 30 according to the first embodiment, and will not be described in detail below.

A winding 412a of wavy shape which is produced by the wave winding forming device 430 is held by the wave winding holding jig 470 according to the sixth embodiment, and transferred to an insert jig 404.

As shown in FIGS. 22 and 23, the holding jig 470 comprises a plurality of guide members 472 detachably mounted on respective inner posts 444 disposed on a turntable 32, a setting member 474 for integrally fixing the guide members 472 while the winding 412a is being held wound in a wavy configuration around the guide members 472, and a plurality of clamp means 476 for pressing the winding 412a wound around the guide members 472 against the guide members 472.

Each of the guide members 472 comprises a substantially semicylindrical member having an opening 478 defined in a flat surface thereof for receiving one of the inner posts 444 fitted therein, and an arcuately curved surface 480 for winding an enameled wire 42 thereon. The opening 478 has an upper end terminating short of an upper end of the guide member 472 which has a threaded hole 481 and a plain hole 482 defined therein. Each of the guide members 472 has two parallel grooves 484a, 484b defined respectively in its upper and lower ends.

The setting member 474 which is of an annular shape has a plurality of pairs of holes 489a, 489b defined therein in registry with the threaded holes 481 and the holes 482 of the respective guide members 472, for receiving respective fastening bolts 486 and positioning pins 488.

Each of the clamp means 476 has a pair of parallel cushioning tubes 490a, 490b made of urethane for protecting the enameled wire 42 against damage, and a pair of elongate rods 492a, 492b inserted respectively in the cushioning tubes 490a, 490b. The rods 492a, 492b have respective upper ends projecting from the upper ends of the cushioning tubes 490a, 490b and fastened to a first engaging bar 494a. The rods 492a, 492b have respective lower end portions projecting a certain length from the lower ends of the cushioning tubes 490a, 490b and extending through a second engaging bar 494b. Coil springs 496a, 496b are disposed around the projecting lower end portions of the rods 492a, 492b between the second engaging bar 494b and the lower ends of the rods 492a, 492b. The first engaging bar 494a is fitted in the groove 484a defined in the upper end of the guide member 472, and the second engaging bar 494b is fitted in the groove 484b defined in the lower end of the guide member 472.

Operation of the holding jig 470 will be described below particularly with regard to the wave winding forming device 430.

With the guide members 472 mounted on the respective inner posts 444 on the turntable 32, the turntable 32 is held in its original position, and the tip end of the enameled wire 42 led from the nozzle 70 is secured to the engaging pin 56 on the turntable 32. Then, the rotatable shaft 50a of a turning motor is rotated counterclockwise in the direction indicated by the arrow in FIG. 21, and the nozzle 70 mounted on the horizontal arm 68 is moved selectively in the three directions along the Z-, X-, and Y-axes. The enameled wire 42 supplied from the nozzle 70 is now wound alternately around outer circumferential surfaces of the respective outer posts 446 and inner circumferential surfaces of the respective inner posts 444, i.e., the curved surfaces 480 of the guide members 472, and moved an increment along the Z-axis each time the turntable 32 makes one revolution. As a consequence, the enameled wire 42 is wound in a desired number of turns axially around the outer posts 446 and the guide members 472.

The enameled wire 42 is now formed into a winding 412a (see FIG. 21) which is of a wavy configuration including outwardly curved portions 428a and inwardly curved portions 428b alternating with the outwardly curved portions 428a. Thereafter, the winding 412a is held by the holding jig 470, removed from the turntable 32, and then placed on the insert jig 404.

More specifically, while the winding 412a is being wound around the curved surfaces 480 of the guide members 472, the first and second engaging bars 494a, 494b of the clamp means 476 are pulled away from each other against the bias of the coil springs 496a, 496b, and then fitted into the respective grooves 484a, 484b of the guide members 472. The tubes 490a, 490b of the clamp means 476 press the winding 412a against the curved surfaces 480 of the guide members 472, for thereby holding the winding 412a in position on the guide members 472.

Then, the positioning pins 488 fixedly received in the holes 489b in the setting member 474 are fitted into the respective holes 482 in the respective guide members 472, and the fastening bolts 486 are threaded through the holes 489a into the threaded holes 481 in the respective guide members 472. The guide members 472 are now integrally fastened to the setting member 474. When the setting member 474 is moved upwardly away from the turntable 442, the guide members 472 are detached from the respective inner posts 444, and the winding 412a is held on the setting member 474 while being kept in its desired wavy configuration.

Then, as shown in FIG. 23, the setting member 474 with the winding 412a held thereon is positioned in axial alignment with the insert jig 404. The setting member 474 and the insert jig 404 are relatively displaced toward each other for inserting the guide members 472 into the insert jig 404 radially inwardly of respective blades 405 thereof. The winding 412a is now inserted in gaps between the blades 405. Thereafter, the holding jig 470 is removed from the winding 412a. The winding 412a is subsequently inserted into some of the slots 20 of the stator core 14.

In the sixth embodiment, the guide members 472 are detachably mounted on the respective inner posts 444, and after the enameled wire 42 is wound into the winding 412a around the curved surfaces 480 of the guide members 472, the winding 412a is secured to the guide members 472 by the clamp means 476, and the guide members 472 are fastened to the setting member 474. Thus, the winding 412a can maintain its wavy structure accurately on the turntable 32, and is prevented from being deformed out of its wavy shape when the winding 412a is transferred from the turntable 32 toward the insert jig 404 and then inserted into the insert jig 404. The winding 412a is thereby kept in its neatly wavy configuration while it is being moved from the turntable 32 to the insert jig 404. Consequently, the entire process of inserting the winding 412a into the stator core 14 can be carried out more accurately and efficiently than the conventional process of keeping the winding 3 in its wavy shape with adhesive tapes during insertion into the stator core 1.

Because the inwardly curved portions 428b of the winding 412a are firmly held against the respective guide members 472 by the clamp means 476, the winding 412a is reliably maintained in the desired wavy configuration while it is being transferred from the turntable 32 into the insert jig 404 and then inserted into the stator core 14. Therefore, the insertion of the winding 412a into the stator core 14 is rendered highly efficiently with ease, resulting in an increase in the rate of production of electric motors.

Although certain preferred embodiments of the present invention have been shown and described in detail, it should be understood that various changes and modifications may be made therein without departing from the scope of the appended claims.

What is claimed is:

1. A wave winding forming device for forming a winding to be inserted into slots of an iron core, into a wavy shape complementary to the slots, comprising:

a turntable;

a winding jig mounted on said turntable, said winding jig comprising a plurality of first posts for forming inwardly curved portions of the wavy shape and a plurality of second posts for forming outwardly curved portions of the wavy shape;

a conductive wire supply for supplying a plurality of conductive wires;

a guide jig for guiding said plurality of conductive wires from said conductive wire supply to said winding jig, wherein said guide jig has a rotatable nozzle for simultaneously guiding said plurality of conductive wires, said rotatable nozzle has a plurality of guide rollers for guiding said plurality of conductive wires in a given direction, and a plurality of outlet holes for guiding said plurality of conductive wires from said guide rollers to an outside of said nozzle, and further wherein said plurality of outlet holes are arranged in upper and lower rows; and a displacing mechanism for relatively displacing said winding jig and said guide jig in axial and radial directions of said turntable to wind said plurality of conductive wires guided by said guide jig alternately around inner circumferential surfaces of said first posts and outer circumferential surfaces of said second posts for thereby forming a wave winding.

2. A wave winding forming device according to claim 1, wherein said outlet holes are arranged in a staggered pattern having a small height and a large width.

3. A wave winding forming device according to claim 2, wherein said outlet holes are arranged in upper and lower rows.

4. A wave winding forming device according to claim 2, wherein said outlet holes are arranged in upper, middle and lower rows.

5. A wave winding forming device and jig for forming a winding to be inserted into slots of an iron core, into a wavy shape complementary to the slots, comprising:

a turntable;

a plurality of first posts mounted on said turntable and having varying-diameter outer circumferential surfaces including smaller-diameter portions on upper end portions thereof, for forming first curved portions of the wavy shape;

a plurality of second posts mounted on said turntable and having varying-diameter outer circumferential surfaces including larger-diameter portions on upper end portions thereof, for forming second curved portions of the wavy shape;

tilting means for tilting said second posts toward a center of said turntable; and a conductive wire supply for supplying a plurality of conductive wires;

a guide jig for guiding said plurality of conductive wires from said conductive wire supply to the posts, wherein said guide jig has a rotatable nozzle for simultaneously guiding said plurality of conductive wires, said rotatable nozzle has a plurality of guide rollers for guiding said plurality of conductive wires in a given direction, and a plurality of outlet holes for guiding said plurality of conductive wires from said guide rollers to an outside of said nozzle, and further wherein said plurality of outlet holes are arranged in upper and lower rows; and a displacing mechanism fop relatively displacing the posts and said guide jig in axial and radial directions of said turntable to wind said plurality of conductive wires guided by said guide jig alternately around inner circumferential surfaces of said first posts and outer circumferential surfaces of said second posts for thereby forming a wave winding.

6. A wave winding forming device and jig according to claim 5, wherein said second posts are disposed radially outwardly of said first posts with respect to said turntable.

7. A wave winding forming device and jig according to claim 5, wherein each of said second posts has an opening defined in the lower end portion thereof, and a substantially L-shaped attachment having an end thereof fixed to an outer circumferential edge portion of said turntable and the other end thereof extending downwardly and disposed in said opening to be rotatably coupled to the lower end portion of said second post with a pin, wherein said second posts being tiltable about respective said pins toward the center of said turntable.

8. A wave winding forming device and jig according to claim 7, wherein each of said second posts has a plunger mounted at a position above said pin, a tip of said plunger being inserted into a hole defined in the side surface of said attachment to keep the second post in a vertical position.

9. A wave winding forming device and jig according to claim 5, wherein each of said first posts is of a stepped shape having an axial succession of outer circumferential surfaces whose diameter decreases progressively toward the upper end of said first post, and each of said second posts is of a stepped shape having an axial succession of outer circumferential surfaces whose diameter increases progressively toward the upper end of said second post.

10. A wave winding forming device and jig according to claim 5, wherein each of said first posts has a first tapered surface progressively greater in diameter toward the upper end of said first post, a second tapered surface progressively smaller in diameter from the end of said first tapered surface toward the upper end of said first post and a third tapered surface progressively greater in diameter from the end of said second tapered surface toward the upper end of said first post, and each of said second posts has a first tapered surface progressively smaller in diameter toward the upper end of said second post, a second tapered surface progressively greater in diameter from the end of said first tapered surface toward the upper end of said second post and a third tapered surface progressively smaller in diameter from the end of said second tapered surface toward the upper end of said second post.

11. A wave winding holding jig for holding a winding to be inserted into slots of an iron core by insert means, in a wavy shape complementary to the slots, and transferring the winding to the insert means, comprising:

a turntable;

a plurality of posts mounted on said turntable for forming first curved portions of the wavy shape;

a plurality of guide members detachably mounted on said posts, respectively, and having respective curved surfaces for supporting the winding wound therearound; and a setting member for being secured to said guide members with the winding being kept in a wavy shape around the guide members.

12. A wave winding holding jig according to claim 11, further comprising clamp means for pressing the winding wound around said guide members against said guide members.

13. A wave winding holding jig according to claim 12, wherein each of said guide members comprises a substantially semicylindrical member having an opening defined in a flat surface thereof for receiving one of said posts, a bolt hole and a pin hole on the upper end surface thereof for fixing said setting member to said upper end surface, and upper and lower grooves for receiving horizontal members of said clamp means therein.

14. A wave winding holding jig according to claim 12, wherein said clamp means shaped in a rectangle frame has a pair of parallel cushioning tubes made of soft plastic covering vertical members thereof for protecting the conductive wires against damage.

15. A wave winding holding jig according to claim 12, wherein said wave winding formed around an annular pattern of said guide members and pressed and held to the guide members by said clamp means is transferred to an insert jig to insert said wave winding into slots of a stator core.

16. A wave winding holding jig according to claim 15, wherein said insert jig has a plurality of blades disposed in a cylindrical shape which is insertable into the central space of said stator core.

17. A wave winding holding jig according to claim 16, wherein said winding is inserted between the blades of said insert jig when said guide members are inserted into said insert jig.

18. A wave winding holding jig according to claim 11, wherein said setting member has an annular shape concentric with said turntable, and fixed to respective said guide members with fixing bolts and positioning pins.

* * * * *